(12) United States Patent
Liu et al.

(10) Patent No.: US 11,940,804 B2
(45) Date of Patent: Mar. 26, 2024

(54) AUTOMATED OBJECT ANNOTATION USING FUSED CAMERA/LIDAR DATA POINTS

(71) Applicant: MOTIONAL AD LLC, Boston, MA (US)

(72) Inventors: Zhongtao Liu, Pittsburgh, PA (US); James Esper, Pittsburgh, PA (US); Jong Ho Lee, Pittsburgh, PA (US)

(73) Assignee: Motional AD LLC, Boston, MA (US)

( * ) Notice: Subject to any disclaimer, the term of this patent is extended or adjusted under 35 U.S.C. 154(b) by 317 days.

(21) Appl. No.: 17/116,081

(22) Filed: Dec. 9, 2020

(65) Prior Publication Data

US 2021/0181745 A1    Jun. 17, 2021

Related U.S. Application Data

(60) Provisional application No. 62/949,345, filed on Dec. 17, 2019.

(51) Int. Cl.
*G06V 20/58* (2022.01)
*B60W 30/08* (2012.01)
(Continued)

(52) U.S. Cl.
CPC ............ *G05D 1/024* (2013.01); *G01S 17/89* (2013.01); *G05D 1/0274* (2013.01);
(Continued)

(58) Field of Classification Search
CPC ............. G05D 1/024; G05D 1/0274; G05D 2201/0213; G05D 1/0088; G05D 1/0257;
(Continued)

(56) References Cited

U.S. PATENT DOCUMENTS

2017/0371348 A1\* 12/2017 Mou .................... G06V 20/56
2018/0136644 A1\*  5/2018 Levinson ............. G05D 1/0027
(Continued)

FOREIGN PATENT DOCUMENTS

EP            3517997 A1      7/2019
WO      WO 2018/218149 A1   11/2018
WO      WO-2018218149 A1 \* 11/2018 ............. G01C 21/32

OTHER PUBLICATIONS

SAE On-Road Automated Vehicle Standards Committee, "SAE International's Standard J3016 Taxonomy and Definitions for Terms Related to Driving Automation Systems for On-Road Motor Vehicles", Jun. 2018, in 35 pages.
(Continued)

*Primary Examiner* — Jonathan L Sample
*Assistant Examiner* — Byron Xavier Kasper
(74) *Attorney, Agent, or Firm* — Knobbe, Martens, Olson & Bear LLP

(57) ABSTRACT

The present disclosure is directed to a computer system and techniques for automatically annotating objects in map data used for navigating an autonomous vehicle. Generally, the computer system is configured to obtain LiDAR data points for an environment around an autonomous vehicle, project the LiDAR data points onto image data, detect a target object in the image data, extract a subset of the LiDAR data points that corresponds to the detected target object, register the detected target object in map data if the extracted subset of the LiDAR data points satisfies registration criteria, and navigate the autonomous vehicle in the environment according to the map data.

19 Claims, 17 Drawing Sheets

(51) Int. Cl.

| | |
|---|---|
| *B60W 40/02* | (2006.01) |
| *G01C 21/16* | (2006.01) |
| *G01C 21/36* | (2006.01) |
| *G01S 7/41* | (2006.01) |
| *G01S 7/48* | (2006.01) |
| *G01S 13/86* | (2006.01) |
| *G01S 13/93* | (2020.01) |
| *G01S 13/931* | (2020.01) |
| *G01S 17/86* | (2020.01) |
| *G01S 17/89* | (2020.01) |
| *G01S 17/931* | (2020.01) |
| *G05D 1/00* | (2006.01) |
| *G06F 18/00* | (2023.01) |
| *G08G 1/0962* | (2006.01) |
| *G08G 1/16* | (2006.01) |

(52) U.S. Cl.
CPC .............. *G06V 20/584* (2022.01); *G08G 1/16* (2013.01); *G05D 2201/0213* (2013.01)

(58) Field of Classification Search
CPC ........ G01S 17/89; G01S 7/411; G01S 7/4802; G01S 7/4808; G01S 13/867; G01S 13/931; G01S 17/86; G01S 17/931; G01S 13/86; G01S 13/93; G01S 7/48; G01S 17/93; G01S 17/88; G01S 17/894; G01S 17/87; G01S 13/865; G06V 20/584; G08G 1/16; G08G 1/09623; B60W 30/08; B60W 60/001; B60W 2420/52; B60W 2420/62; B60W 2420/42; G06F 18/00; G01C 21/3679; G01C 21/1652; G01C 21/38; G05S 17/931; G06T 2207/30252; G06T 7/70

See application file for complete search history.

(56) References Cited

U.S. PATENT DOCUMENTS

| | | | |
|---|---|---|---|
| 2018/0321686 A1* | 11/2018 | Kanzawa | G05D 1/0246 |
| 2019/0065867 A1* | 2/2019 | Huang | G08G 1/167 |
| 2019/0163193 A1 | 5/2019 | Lingg et al. | |
| 2019/0197778 A1 | 6/2019 | Sachdeva et al. | |
| 2019/0202449 A1* | 7/2019 | Taveira | G05D 1/0202 |
| 2019/0271549 A1 | 9/2019 | Zhang et al. | |
| 2019/0291723 A1 | 9/2019 | Srivatsa et al. | |
| 2019/0376809 A1* | 12/2019 | Hanniel | G01C 21/3602 |
| 2020/0290604 A1* | 9/2020 | Kim | B60W 30/09 |
| 2021/0406618 A1 | 12/2021 | Park et al. | |

OTHER PUBLICATIONS

Yoneda, K. et al., "Automated driving recognition technologies for adverse weather conditions", IATSS Research, Nov. 2019, vol. 43, pp. 253-262.

German Office Action issued for Application No. DE 102020133982. 8, dated Oct. 29, 2021.

Great Britain Office Action issued for Application No. GB 2019873. 5, dated Aug. 3, 2021.

Korean Office Action issued for Application No. KR 10-2020-0175311, dated Jun. 13, 2022.

Great Britain Office Action issued for Application No. GB 2019873. 5, dated Jul. 11, 2023.

Korean Notice of Allowance issued for Application No. KR 10-2020-0175311, dated Apr. 4, 2023.

Korean Office Action issued for Application No. KR 10-2020-0175311, dated Dec. 7, 2022.

Chinese Office Action issued for Application No. CN 202011498625.7 dated Jan. 11, 2024.

Korean Office Action issued for Application No. KR 10-2023-0085229, dated Dec. 19, 2023.

\* cited by examiner

AUTOMATED OBJECT ANNOTATION USING FUSED CAMERA/LIDAR DATA POINTS

CROSS-REFERENCE TO RELATED APPLICATIONS

This application claims the benefit of U.S. Provisional Patent Application No. 62/949,345, filed Dec. 17, 2019, entitled "AUTOMATED OBJECT ANNOTATION USING FUSED CAMERA/LiDAR DATA POINTS," the entire contents of which are hereby incorporated by reference.

FIELD

This description relates to a computer system for fusing camera and LiDAR data points to perform automated annotation of objects in map data used for navigating an autonomous vehicle.

BACKGROUND

Autonomous vehicles can be used to transport people and/or cargo (e.g., packages, objects, or other items) from one location to another. For example, an autonomous vehicle can navigate to the location of a person, wait for the person to board the autonomous vehicle, and navigate to a specified destination (e.g., a location selected by the person). To navigate in the environment, these autonomous vehicles are equipped with various types of sensors to detect objects in the surroundings.

SUMMARY

The subject matter described in this specification is directed to a computer system and techniques for automatically annotating objects in map data used for navigating an autonomous vehicle. Generally, the computer system is configured to obtain LiDAR data points for an environment around an autonomous vehicle, project the LiDAR data points onto image data, detect a target object in the image data, extract a subset of the LiDAR data points that corresponds to the detected target object, register the detected target object in map data if the extracted subset of the LiDAR data points satisfies registration criteria, and navigate the autonomous vehicle in the environment according to the map data.

These and other aspects, features, and implementations can be expressed as methods, apparatuses, systems, components, program products, means or steps for performing a function, and in other ways.

These and other aspects, features, and implementations will become apparent from the following descriptions, including the claims.

DETAILED DESCRIPTION

Figure 1:
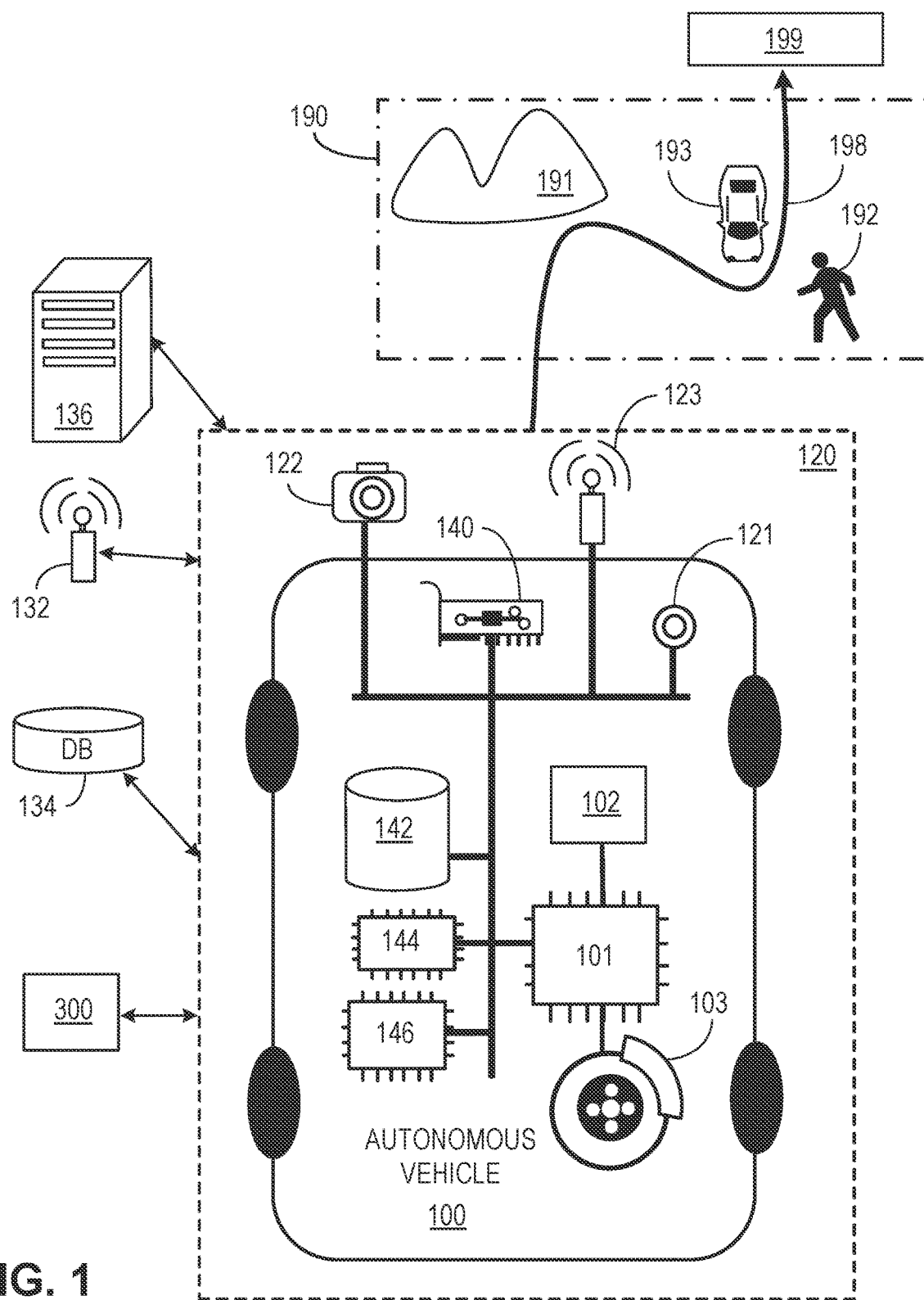
FIG. 1 shows an example of an autonomous vehicle having autonomous capability.

In the following description, for the purposes of explanation, numerous specific details are set forth in order to provide a thorough understanding of the present disclosure. It will be apparent, however, that the disclosed techniques may be practiced without these specific details. In other instances, well-known structures and devices are shown in block diagram form in order to avoid unnecessarily obscuring the disclosed techniques.

In the drawings, specific arrangements or orderings of schematic elements, such as those representing devices, modules, instruction blocks and data elements, are shown for ease of description. However, it should be understood by those skilled in the art that the specific ordering or arrangement of the schematic elements in the drawings is not meant to imply that a particular order or sequence of processing, or separation of processes, is required. Further, the inclusion of a schematic element in a drawing is not meant to imply that such element is required in all embodiments or that the features represented by such element may not be included in or combined with other elements in some embodiments.

Further, in the drawings, where connecting elements, such as solid or dashed lines or arrows, are used to illustrate a connection, relationship, or association between or among two or more other schematic elements, the absence of any such connecting elements is not meant to imply that no connection, relationship, or association can exist. In other words, some connections, relationships, or associations between elements are not shown in the drawings so as not to obscure the disclosure. In addition, for ease of illustration, a single connecting element is used to represent multiple connections, relationships or associations between elements. For example, where a connecting element represents a communication of signals, data, or instructions, it should be understood by those skilled in the art that such element represents one or multiple signal paths (e.g., a bus), as may be needed, to affect the communication.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Several features are described hereafter that can each be used independently of one another or with any combination of other features. However, any individual feature may not address any of the problems discussed above or might only address one of the problems discussed above. Some of the problems discussed above might not be fully addressed by any of the features described herein. Although headings are provided, information related to a particular heading, but not found in the section having that heading, may also be found elsewhere in this description. Embodiments are described herein according to the following outline:

1. General Overview
2. Hardware Overview
3. Autonomous Vehicle Architecture
4. Autonomous Vehicle Inputs
5. Autonomous Vehicle Planning
6. Autonomous Vehicle Control
7. Computing System for Automated Object Annotation
8. Example Process for Performing Automated Object Annotation General Overview Autonomous vehicles driving in complex environments (e.g., an urban environment) pose a great technological challenge. In order for autonomous vehicles to navigate these environments, the vehicles use map data to guide the navigation of the vehicle in the environment. The map data can include an indication of objects in the environment such as, for example, traffic lights. One approach for identifying the presence of objects in the map data involves manually reviewing image data to identify objects and annotating the presence of the objects in the image data. However, such approaches provide limited information and are costly, time consuming, inefficient, and susceptible to human error. The present disclosure provides an improved technique for annotating objects in map data that involves fusing LiDAR data points with image data and performing automated object detection on the fused data to enhance the map data by including an indication of the detected objects and associated pose data for the objects.

In particular, the system and techniques described herein use a LiDAR (e.g., a LiDAR system) to obtain LiDAR data points for an environment around the autonomous vehicle. The LiDAR data points are combined (fused) with (e.g., projected onto) image data of the environment. The image data is then analyzed to detect a target object, and LiDAR data points that correspond to the detected target object (e.g., that are co-located with the target object in the image data) are extracted and analyzed to potentially provide additional information (e.g., pose data) for the detected target object. The detected target object is then registered in the map data that is used when navigating the vehicle in the environment. When compared to conventional object-detection practices, the disclosed technique improves accuracy and efficiency of object detection, and provides greater detail for the detected objects.

Hardware Overview

FIG. 1 shows an example of an autonomous vehicle 100 having autonomous capability.

As used herein, the term "autonomous capability" refers to a function, feature, or facility that enables a vehicle to be partially or fully operated without real-time human intervention, including without limitation fully autonomous vehicles, highly autonomous vehicles, and conditionally autonomous vehicles.

As used herein, an autonomous vehicle (AV) is a vehicle that possesses autonomous capability.

As used herein, "vehicle" includes means of transportation of goods or people. For example, cars, buses, trains, airplanes, drones, trucks, boats, ships, submersibles, dirigibles, etc. A driverless car is an example of a vehicle.

As used herein, "trajectory" refers to a path or route to navigate an AV from a first spatiotemporal location to a second spatiotemporal location. In an embodiment, the first spatiotemporal location is referred to as the initial or starting location and the second spatiotemporal location is referred to as the destination, final location, goal, goal position, or goal location. In some examples, a trajectory is made up of one or more segments (e.g., sections of road) and each segment is made up of one or more blocks (e.g., portions of a lane or intersection). In an embodiment, the spatiotemporal locations correspond to real world locations. For example, the spatiotemporal locations are pick up or drop-off locations to pick up or drop-off persons or goods.

As used herein, "sensor(s)" includes one or more hardware components that detect information about the environment surrounding the sensor. Some of the hardware components can include sensing components (e.g., image sensors, biometric sensors), transmitting and/or receiving components (e.g., laser or radio frequency wave transmitters and receivers), electronic components such as analog-to-digital converters, a data storage device (such as a RAM and/or a nonvolatile storage), software or firmware components and data processing components such as an ASIC (application-specific integrated circuit), a microprocessor and/or a microcontroller.

As used herein, a "scene description" is a data structure (e.g., list) or data stream that includes one or more classified or labeled objects detected by one or more sensors on the AV vehicle or provided by a source external to the AV.

As used herein, a "road" is a physical area that can be traversed by a vehicle, and may correspond to a named thoroughfare (e.g., city street, interstate freeway, etc.) or may correspond to an unnamed thoroughfare (e.g., a driveway in a house or office building, a section of a parking lot, a section of a vacant lot, a dirt path in a rural area, etc.). Because some vehicles (e.g., 4-wheel-drive pickup trucks, sport utility vehicles, etc.) are capable of traversing a variety of physical areas not specifically adapted for vehicle travel, a "road" may be a physical area not formally defined as a thoroughfare by any municipality or other governmental or administrative body.

As used herein, a "lane" is a portion of a road that can be traversed by a vehicle, and may correspond to most or all of the space between lane markings, or may correspond to only some (e.g., less than 50%) of the space between lane markings. For example, a road having lane markings spaced far apart might accommodate two or more vehicles between the markings, such that one vehicle can pass the other without traversing the lane markings, and thus could be interpreted as having a lane narrower than the space between the lane markings, or having two lanes between the lane markings. A lane could also be interpreted in the absence of lane markings. For example, a lane may be defined based on physical features of an environment, e.g., rocks and trees along a thoroughfare in a rural area.

"One or more" includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact, unless specified otherwise.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this description, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

As used herein, an AV system refers to the AV along with the array of hardware, software, stored data, and data generated in real-time that supports the operation of the AV. In an embodiment, the AV system is incorporated within the AV. In an embodiment, the AV system is spread across several locations. For example, some of the software of the AV system is implemented on a cloud computing environment similar to cloud computing environment 200 described below with respect to FIG. 2.

In general, this document describes technologies applicable to any vehicles that have one or more autonomous capabilities including fully autonomous vehicles, highly autonomous vehicles, and conditionally autonomous vehicles, such as so-called Level 5, Level 4, and Level 3 vehicles, respectively (see SAE International's standard J3016: Taxonomy and Definitions for Terms Related to On-Road Motor Vehicle Automated Driving Systems, which is incorporated by reference in its entirety, for more details on the classification of levels of autonomy in vehicles). The technologies described in this document are also applicable to partially autonomous vehicles and driver assisted vehicles, such as so-called Level 2 and Level 1 vehicles (see SAE International's standard J3016: Taxonomy and Definitions for Terms Related to On-Road Motor Vehicle Automated Driving Systems). In an embodiment, one or more of the Level 1, 2, 3, 4, and 5 vehicle systems may automate certain vehicle operations (e.g., steering, braking, and using maps) under certain operating conditions based on processing of sensor inputs. The technologies described in this document can benefit vehicles in any levels, ranging from fully autonomous vehicles to human-operated vehicles.

Referring to FIG. 1, an AV system 120 operates the AV 100 along a trajectory 198 through an environment 190 to a destination 199 (sometimes referred to as a final location) while avoiding objects (e.g., natural obstructions 191, vehicles 193, pedestrians 192, cyclists, and other obstacles) and obeying rules of the road (e.g., rules of operation or driving preferences).

In an embodiment, the AV system 120 includes devices 101 that are instrumented to receive and act on operational commands from the computer processors 146. In an embodiment, computing processors 146 are similar to the processor 304 described below in reference to FIG. 3. Examples of devices 101 include a steering control 102, brakes 103, gears, accelerator pedal or other acceleration control mechanisms, windshield wipers, side-door locks, window controls, and turn-indicators.

In an embodiment, the AV system 120 includes sensors 121 for measuring or inferring properties of state or condition of the AV 100, such as the AV's position, linear and angular velocity and acceleration, and heading (e.g., an orientation of the leading end of AV 100). Examples of sensors 121 are GPS, inertial measurement units (IMU) that measure both vehicle linear accelerations and angular rates, wheel speed sensors for measuring or estimating wheel slip ratios, wheel brake pressure or braking torque sensors, engine torque or wheel torque sensors, and steering angle and angular rate sensors.

In an embodiment, the sensors 121 also include sensors for sensing or measuring properties of the AV's environment. For example, monocular or stereo video cameras 122 in the visible light, infrared or thermal (or both) spectra, LiDAR 123, RADAR, ultrasonic sensors, time-of-flight (TOF) depth sensors, speed sensors, temperature sensors, humidity sensors, and precipitation sensors.

In an embodiment, the AV system 120 includes a data storage unit 142 and memory 144 for storing machine instructions associated with computer processors 146 or data collected by sensors 121. In an embodiment, the data storage unit 142 is similar to the ROM 308 or storage device 310 described below in relation to FIG. 3. In an embodiment, memory 144 is similar to the main memory 306 described below. In an embodiment, the data storage unit 142 and memory 144 store historical, real-time, and/or predictive information about the environment 190. In an embodiment, the stored information includes maps, driving performance, traffic congestion updates or weather conditions. In an embodiment, data relating to the environment 190 is transmitted to the AV 100 via a communications channel from a remotely located database 134.

In an embodiment, the AV system 120 includes communications devices 140 for communicating measured or inferred properties of other vehicles' states and conditions, such as positions, linear and angular velocities, linear and angular accelerations, and linear and angular headings to the AV 100. These devices include Vehicle-to-Vehicle (V2V) and Vehicle-to-Infrastructure (V2I) communication devices and devices for wireless communications over point-to-point or ad hoc networks or both. In an embodiment, the communications devices 140 communicate across the electromagnetic spectrum (including radio and optical communications) or other media (e.g., air and acoustic media). A combination of Vehicle-to-Vehicle (V2V) Vehicle-to-Infrastructure (V2I) communication (and, in some embodiments, one or more other types of communication) is sometimes referred to as Vehicle-to-Everything (V2X) communication. V2X communication typically conforms to one or more communications standards for communication with, between, and among autonomous vehicles.

In an embodiment, the communication devices 140 include communication interfaces. For example, wired, wireless, WiMAX, WiFi, Bluetooth, satellite, cellular, optical, near field, infrared, or radio interfaces. The communication interfaces transmit data from a remotely located database 134 to AV system 120. In an embodiment, the remotely located database 134 is embedded in a cloud computing environment 200 as described in FIG. 2. The communication interfaces 140 transmit data collected from sensors 121 or other data related to the operation of AV 100 to the remotely located database 134. In an embodiment, communication interfaces 140 transmit information that relates to teleoperations to the AV 100. In some embodiments, the AV 100 communicates with other remote (e.g., "cloud") servers 136.

In an embodiment, the remotely located database 134 also stores and transmits digital data (e.g., storing data such as road and street locations). Such data is stored on the memory 144 on the AV 100, or transmitted to the AV 100 via a communications channel from the remotely located database 134.

In an embodiment, the remotely located database 134 stores and transmits historical information about driving properties (e.g., speed and acceleration profiles) of vehicles that have previously traveled along trajectory 198 at similar times of day. In one implementation, such data may be stored on the memory 144 on the AV 100, or transmitted to the AV 100 via a communications channel from the remotely located database 134.

Computing devices 146 located on the AV 100 algorithmically generate control actions based on both real-time sensor data and prior information, allowing the AV system 120 to execute its autonomous driving capabilities.

In an embodiment, the AV system 120 includes computer peripherals 132 coupled to computing devices 146 for providing information and alerts to, and receiving input from, a user (e.g., an occupant or a remote user) of the AV 100. In an embodiment, peripherals 132 are similar to the display 312, input device 314, and cursor controller 316 discussed below in reference to FIG. 3. The coupling is wireless or wired. Any two or more of the interface devices may be integrated into a single device.

Figure 2:
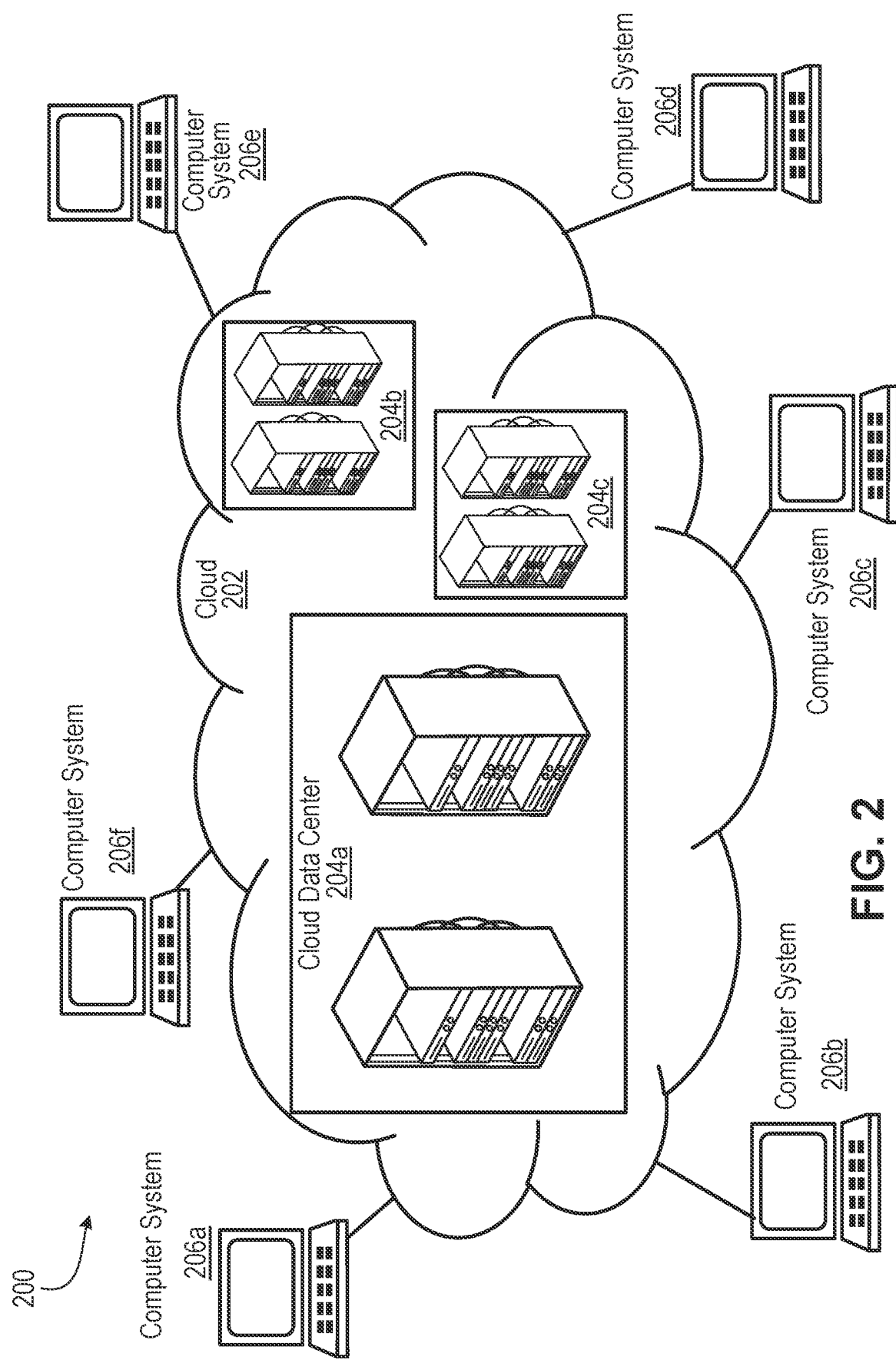
FIG. 2 illustrates an example "cloud" computing environment.

FIG. 2 illustrates an example "cloud" computing environment. Cloud computing is a model of service delivery for enabling convenient, on-demand network access to a shared pool of configurable computing resources (e.g., networks, network bandwidth, servers, processing, memory, storage, applications, virtual machines, and services). In typical cloud computing systems, one or more large cloud data centers house the machines used to deliver the services provided by the cloud. Referring now to FIG. 2, the cloud computing environment 200 includes cloud data centers 204a, 204b, and 204c that are interconnected through the cloud 202. Data centers 204a, 204b, and 204c provide cloud computing services to computer systems 206a, 206b, 206c, 206d, 206e, and 206f connected to cloud 202.

The cloud computing environment 200 includes one or more cloud data centers. In general, a cloud data center, for example the cloud data center 204a shown in FIG. 2, refers to the physical arrangement of servers that make up a cloud, for example the cloud 202 shown in FIG. 2, or a particular portion of a cloud. For example, servers are physically arranged in the cloud datacenter into rooms, groups, rows, and racks. A cloud datacenter has one or more zones, which include one or more rooms of servers. Each room has one or more rows of servers, and each row includes one or more racks. Each rack includes one or more individual server nodes. In some implementation, servers in zones, rooms, racks, and/or rows are arranged into groups based on physical infrastructure requirements of the datacenter facility, which include power, energy, thermal, heat, and/or other requirements. In an embodiment, the server nodes are similar to the computer system described in FIG. 3. The data center 204a has many computing systems distributed through many racks.

The cloud 202 includes cloud data centers 204a, 204b, and 204c along with the network and networking resources (for example, networking equipment, nodes, routers, switches, and networking cables) that interconnect the cloud data centers 204a, 204b, and 204c and help facilitate the computing systems' 206a-f access to cloud computing services. In an embodiment, the network represents any combination of one or more local networks, wide area networks, or internetworks coupled using wired or wireless links deployed using terrestrial or satellite connections. Data exchanged over the network, is transferred using any number of network layer protocols, such as Internet Protocol (IP), Multiprotocol Label Switching (MPLS), Asynchronous Transfer Mode (ATM), Frame Relay, etc. Furthermore, in embodiments where the network represents a combination of multiple sub-networks, different network layer protocols are used at each of the underlying sub-networks. In some embodiments, the network represents one or more interconnected internetworks, such as the public Internet.

The computing systems 206a-f or cloud computing services consumers are connected to the cloud 202 through network links and network adapters. In an embodiment, the computing systems 206a-f are implemented as various computing devices, for example servers, desktops, laptops, tablet, smartphones, Internet of Things (IoT) devices, autonomous vehicles (including, cars, drones, shuttles, trains, buses, etc.) and consumer electronics. In an embodiment, the computing systems 206a-f are implemented in or as a part of other systems.

Figure 3:
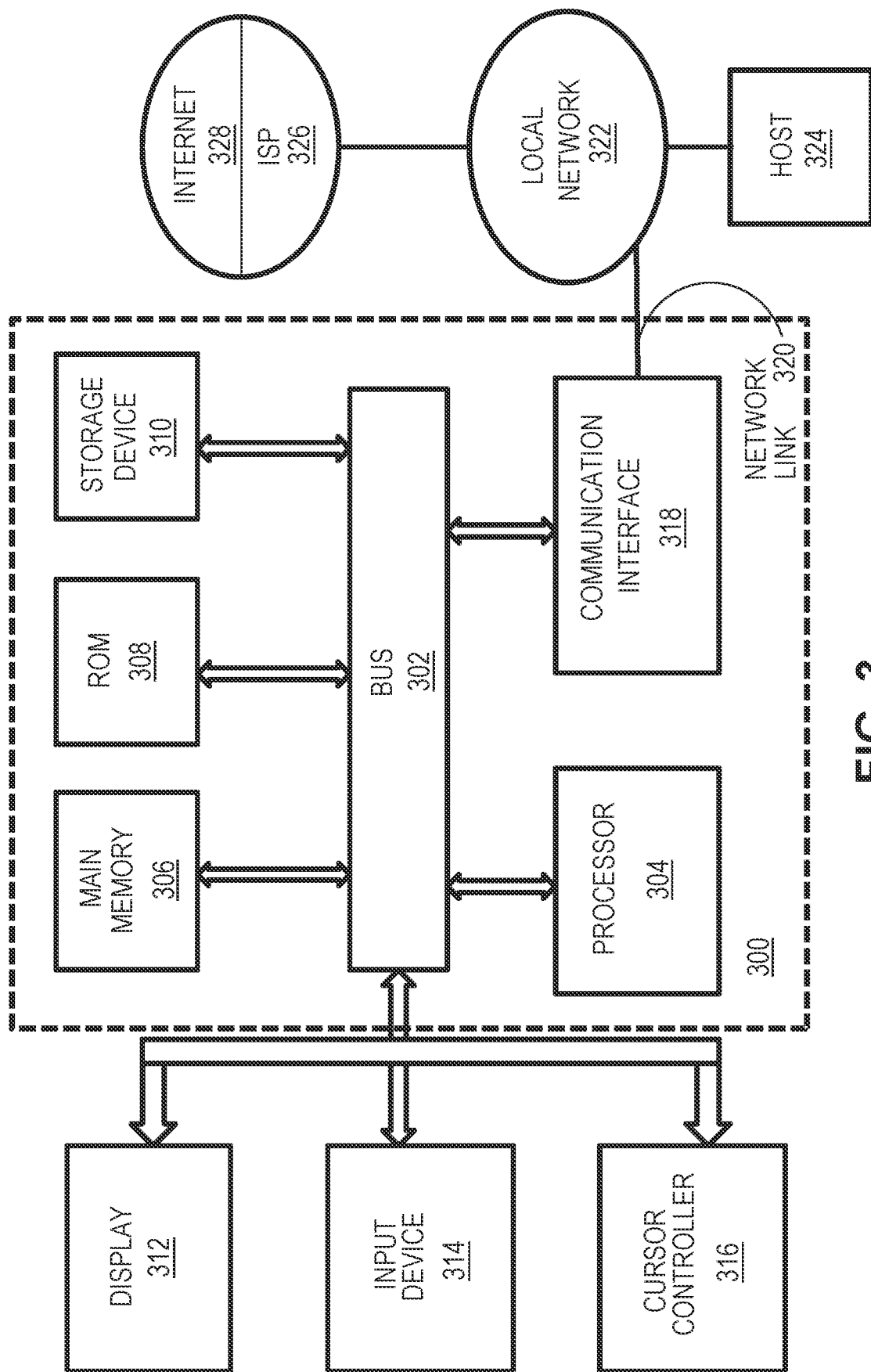
FIG. 3 illustrates a computer system.

FIG. 3 illustrates a computer system 300. In an implementation, the computer system 300 is a special purpose computing device. The special-purpose computing device is hard-wired to perform the techniques or includes digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. In various embodiments, the special-purpose computing devices are desktop computer systems, portable computer systems, handheld devices, network devices or any other device that incorporates hard-wired and/or program logic to implement the techniques.

In an embodiment, the computer system 300 includes a bus 302 or other communication mechanism for communicating information, and a hardware processor 304 coupled with a bus 302 for processing information. The hardware processor 304 is, for example, a general-purpose microprocessor. The computer system 300 also includes a main memory 306, such as a random-access memory (RAM) or other dynamic storage device, coupled to the bus 302 for storing information and instructions to be executed by processor 304. In one implementation, the main memory 306 is used for storing temporary variables or other intermediate information during execution of instructions to be executed by the processor 304. Such instructions, when stored in non-transitory storage media accessible to the processor 304, render the computer system 300 into a special-purpose machine that is customized to perform the operations specified in the instructions.

In an embodiment, the computer system 300 further includes a read only memory (ROM) 308 or other static storage device coupled to the bus 302 for storing static information and instructions for the processor 304. A storage device 310, such as a magnetic disk, optical disk, solid-state drive, or three-dimensional cross point memory is provided and coupled to the bus 302 for storing information and instructions.

In an embodiment, the computer system 300 is coupled via the bus 302 to a display 312, such as a cathode ray tube (CRT), a liquid crystal display (LCD), plasma display, light emitting diode (LED) display, or an organic light emitting diode (OLED) display for displaying information to a computer user. An input device 314, including alphanumeric and other keys, is coupled to bus 302 for communicating information and command selections to the processor 304. Another type of user input device is a cursor controller 316, such as a mouse, a trackball, a touch-enabled display, or cursor direction keys for communicating direction information and command selections to the processor 304 and for controlling cursor movement on the display 312. This input device typically has two degrees of freedom in two axes, a first axis (e.g., x-axis) and a second axis (e.g., y-axis), that allows the device to specify positions in a plane.

According to one embodiment, the techniques herein are performed by the computer system 300 in response to the processor 304 executing one or more sequences of one or more instructions contained in the main memory 306. Such instructions are read into the main memory 306 from another storage medium, such as the storage device 310. Execution of the sequences of instructions contained in the main memory 306 causes the processor 304 to perform the process steps described herein. In alternative embodiments, hard-wired circuitry is used in place of or in combination with software instructions.

The term "storage media" as used herein refers to any non-transitory media that store data and/or instructions that cause a machine to operate in a specific fashion. Such storage media includes non-volatile media and/or volatile media. Non-volatile media includes, for example, optical disks, magnetic disks, solid-state drives, or three-dimensional cross point memory, such as the storage device 310. Volatile media includes dynamic memory, such as the main memory 306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NV-RAM, or any other memory chip or cartridge.

Storage media is distinct from, but may be used in conjunction with, transmission media. Transmission media participates in transferring information between storage media. For example, transmission media includes coaxial cables, copper wire and fiber optics, including the wires that comprise the bus 302. Transmission media can also take the form of acoustic or light waves, such as those generated during radio-wave and infrared data communications.

In an embodiment, various forms of media are involved in carrying one or more sequences of one or more instructions to the processor 304 for execution. For example, the instructions are initially carried on a magnetic disk or solid-state drive of a remote computer. The remote computer loads the instructions into its dynamic memory and send the instructions over a telephone line using a modem. A modem local to the computer system 300 receives the data on the telephone line and use an infrared transmitter to convert the data to an infrared signal. An infrared detector receives the data carried in the infrared signal and appropriate circuitry places the data on the bus 302. The bus 302 carries the data to the main memory 306, from which processor 304 retrieves and executes the instructions. The instructions received by the main memory 306 may optionally be stored on the storage device 310 either before or after execution by processor 304.

The computer system 300 also includes a communication interface 318 coupled to the bus 302. The communication interface 318 provides a two-way data communication coupling to a network link 320 that is connected to a local network 322. For example, the communication interface 318 is an integrated service digital network (ISDN) card, cable modem, satellite modem, or a modem to provide a data communication connection to a corresponding type of telephone line. As another example, the communication interface 318 is a local area network (LAN) card to provide a data communication connection to a compatible LAN. In some implementations, wireless links are also implemented. In any such implementation, the communication interface 318 sends and receives electrical, electromagnetic, or optical signals that carry digital data streams representing various types of information.

The network link 320 typically provides data communication through one or more networks to other data devices. For example, the network link 320 provides a connection through the local network 322 to a host computer 324 or to a cloud data center or equipment operated by an Internet Service Provider (ISP) 326. The ISP 326 in turn provides data communication services through the world-wide packet data communication network now commonly referred to as the "Internet" 328. The local network 322 and Internet 328 both use electrical, electromagnetic or optical signals that carry digital data streams. The signals through the various networks and the signals on the network link 320 and through the communication interface 318, which carry the digital data to and from the computer system 300, are example forms of transmission media. In an embodiment, the network 320 contains the cloud 202 or a part of the cloud 202 described above.

The computer system 300 sends messages and receives data, including program code, through the network(s), the network link 320, and the communication interface 318. In an embodiment, the computer system 300 receives code for processing. The received code is executed by the processor 304 as it is received, and/or stored in storage device 310, or other non-volatile storage for later execution.

Autonomous Vehicle Architecture

Figure 4:
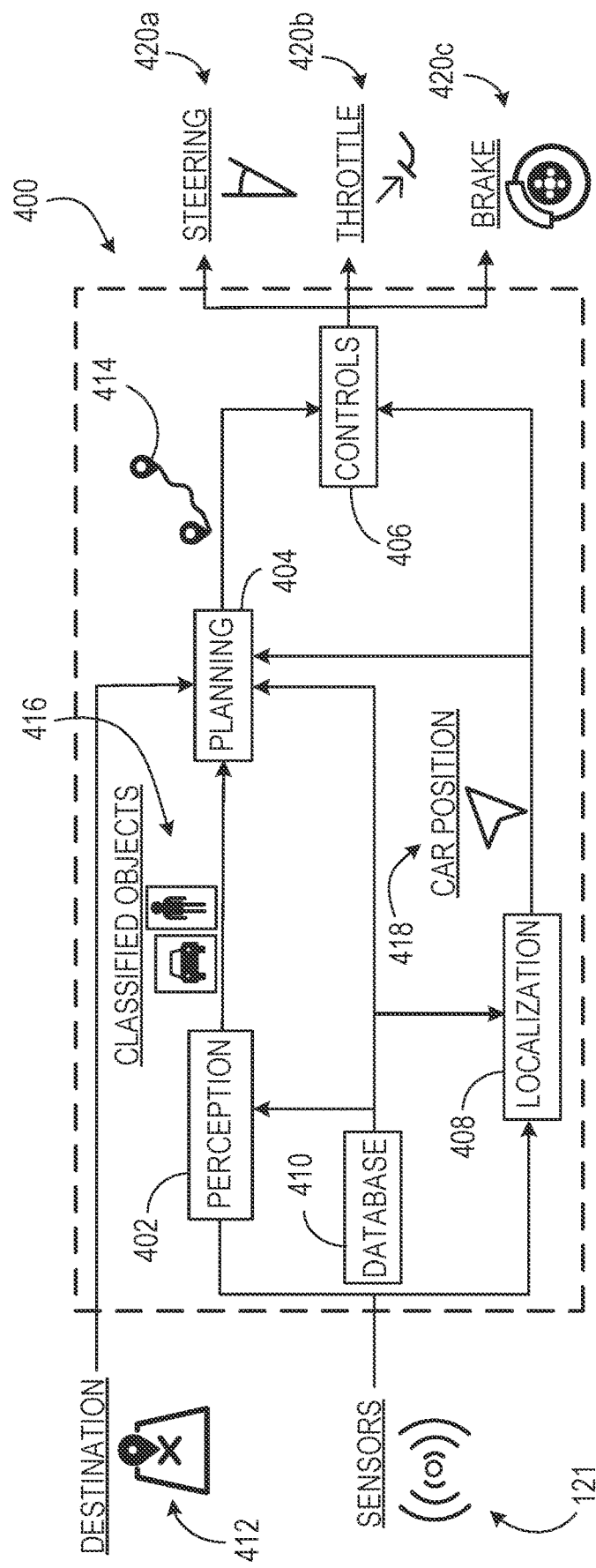
FIG. 4 shows an example architecture for an autonomous vehicle.

FIG. 4 shows an example architecture 400 for an autonomous vehicle (e.g., the AV 100 shown in FIG. 1). The architecture 400 includes a perception module 402 (sometimes referred to as a perception circuit), a planning module 404 (sometimes referred to as a planning circuit), a control module 406 (sometimes referred to as a control circuit), a localization module 408 (sometimes referred to as a localization circuit), and a database module 410 (sometimes referred to as a database circuit). Each module plays a role in the operation of the AV 100. Together, the modules 402, 404, 406, 408, and 410 may be part of the AV system 120 shown in FIG. 1. In some embodiments, any of the modules 402, 404, 406, 408, and 410 is a combination of computer software (e.g., executable code stored on a computer-readable medium) and computer hardware (e.g., one or more microprocessors, microcontrollers, application-specific integrated circuits [ASICs]), hardware memory devices, other types of integrated circuits, other types of computer hardware, or a combination of any or all of these things).

In use, the planning module 404 receives data representing a destination 412 and determines data representing a trajectory 414 (sometimes referred to as a route) that can be traveled by the AV 100 to reach (e.g., arrive at) the destination 412. In order for the planning module 404 to determine the data representing the trajectory 414, the planning module 404 receives data from the perception module 402, the localization module 408, and the database module 410.

The perception module 402 identifies nearby physical objects using one or more sensors 121, e.g., as also shown in FIG. 1. The objects are classified (e.g., grouped into types such as pedestrian, bicycle, automobile, traffic sign, etc.) and a scene description including the classified objects 416 is provided to the planning module 404.

The planning module 404 also receives data representing the AV position 418 from the localization module 408. The localization module 408 determines the AV position by using data from the sensors 121 and data from the database module 410 (e.g., a geographic data) to calculate a position. For example, the localization module 408 uses data from a GNSS (Global Navigation Satellite System) sensor and geographic data to calculate a longitude and latitude of the AV. In an embodiment, data used by the localization module 408 includes high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations of them), and maps describing the spatial locations of road features such as crosswalks, traffic signs or other travel signals of various types.

The control module 406 receives the data representing the trajectory 414 and the data representing the AV position 418 and operates the control functions 420a-c (e.g., steering, throttling, braking, ignition) of the AV in a manner that will cause the AV 100 to travel the trajectory 414 to the destination 412. For example, if the trajectory 414 includes a left turn, the control module 406 will operate the control functions 420a-c in a manner such that the steering angle of the steering function will cause the AV 100 to turn left and the throttling and braking will cause the AV 100 to pause and wait for passing pedestrians or vehicles before the turn is made.

Autonomous Vehicle Inputs

Figure 5:
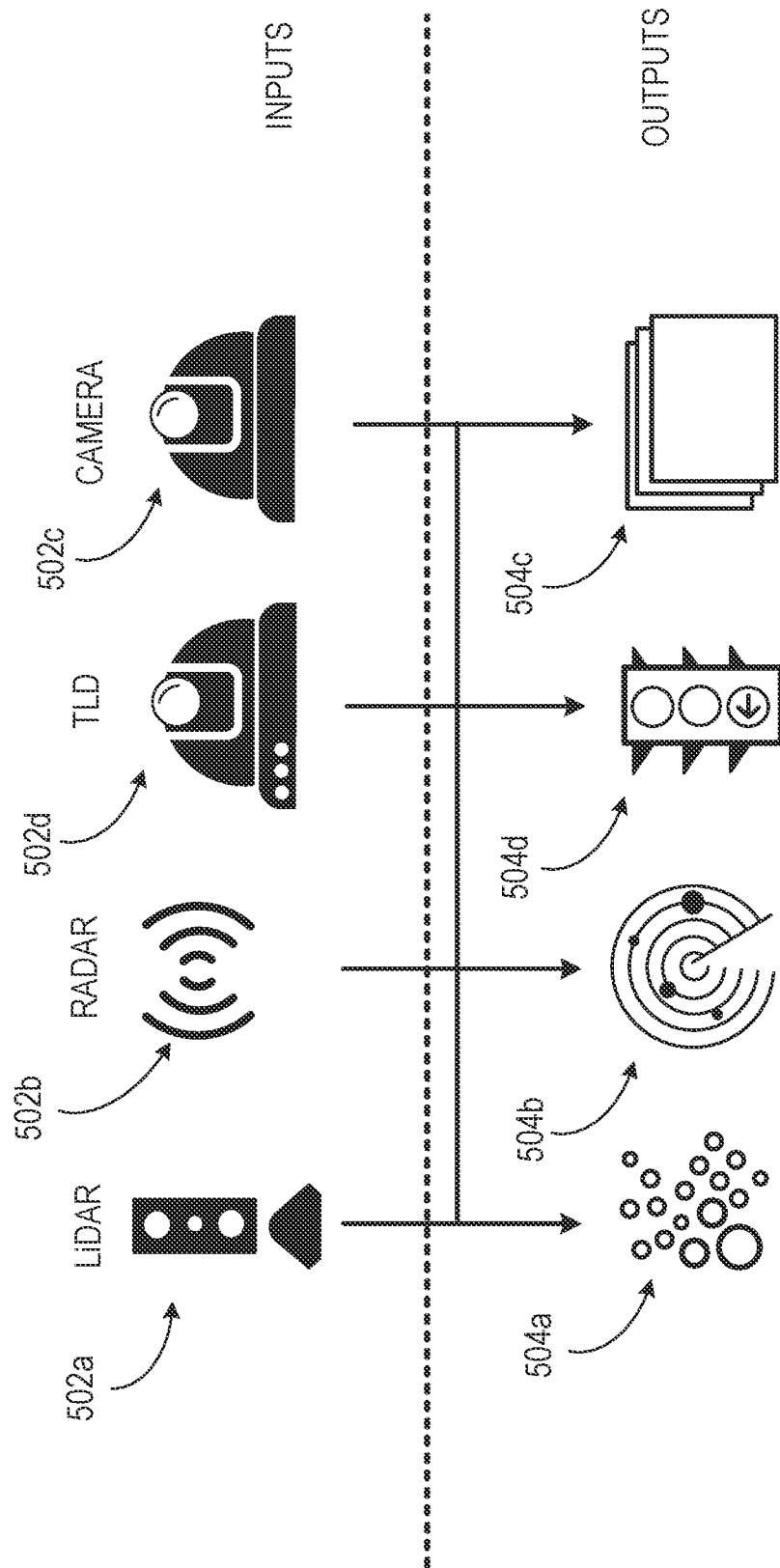
FIG. 5 shows an example of inputs and outputs that may be used by a perception module.

FIG. 5 shows an example of inputs 502a-d (e.g., sensors 121 shown in FIG. 1) and outputs 504a-d (e.g., sensor data) that is used by the perception module 402 (FIG. 4). One input 502a is a LiDAR (Light Detection and Ranging) system (e.g., LiDAR 123 shown in FIG. 1). LiDAR is a technology that uses light (e.g., bursts of light such as infrared light) to obtain data about physical objects in its line of sight. A LiDAR system produces LiDAR data as output 504a. For example, LiDAR data is collections of 3D or 2D points (also known as a point clouds) that are used to construct a representation of the environment 190.

Another input 502b is a RADAR system. RADAR is a technology that uses radio waves to obtain data about nearby physical objects. RADARs can obtain data about objects not within the line of sight of a LiDAR system. A RADAR system 502b produces RADAR data as output 504b. For example, RADAR data are one or more radio frequency electromagnetic signals that are used to construct a representation of the environment 190.

Another input 502c is a camera system. A camera system uses one or more cameras (e.g., digital cameras using a light sensor such as a charge-coupled device [CCD]) to obtain information about nearby physical objects. A camera system produces camera data as output 504c. Camera data often takes the form of image data (e.g., data in an image data format such as RAW, JPEG, PNG, etc.). In some examples, the camera system has multiple independent cameras, e.g., for the purpose of stereopsis (stereo vision), which enables the camera system to perceive depth. Although the objects perceived by the camera system are described here as "nearby," this is relative to the AV. In use, the camera system may be configured to "see" objects far, e.g., up to a kilometer or more ahead of the AV. Accordingly, the camera system may have features such as sensors and lenses that are optimized for perceiving objects that are far away.

Another input 502d is a traffic light detection (TLD) system. A TLD system uses one or more cameras to obtain information about traffic lights, street signs, and other physical objects that provide visual navigation information. A TLD system produces TLD data as output 504d. TLD data often takes the form of image data (e.g., data in an image data format such as RAW, JPEG, PNG, etc.). A TLD system differs from a system incorporating a camera in that a TLD system uses a camera with a wide field of view (e.g., using a wide-angle lens or a fish-eye lens) in order to obtain information about as many physical objects providing visual navigation information as possible, so that the AV 100 has access to all relevant navigation information provided by these objects. For example, the viewing angle of the TLD system may be about 120 degrees or more.

In some embodiments, outputs 504a-d are combined using a sensor fusion technique. Thus, either the individual outputs 504a-d are provided to other systems of the AV 100 (e.g., provided to a planning module 404 as shown in FIG. 4), or the combined output can be provided to the other systems, either in the form of a single combined output or multiple combined outputs of the same type (e.g., using the same combination technique or combining the same outputs or both) or different types (e.g., using different respective combination techniques or combining different respective outputs or both). In some embodiments, an early fusion technique is used. An early fusion technique is characterized by combining outputs before one or more data processing steps are applied to the combined output. In some embodiments, a late fusion technique is used. A late fusion technique is characterized by combining outputs after one or more data processing steps are applied to the individual outputs.

Figure 6:
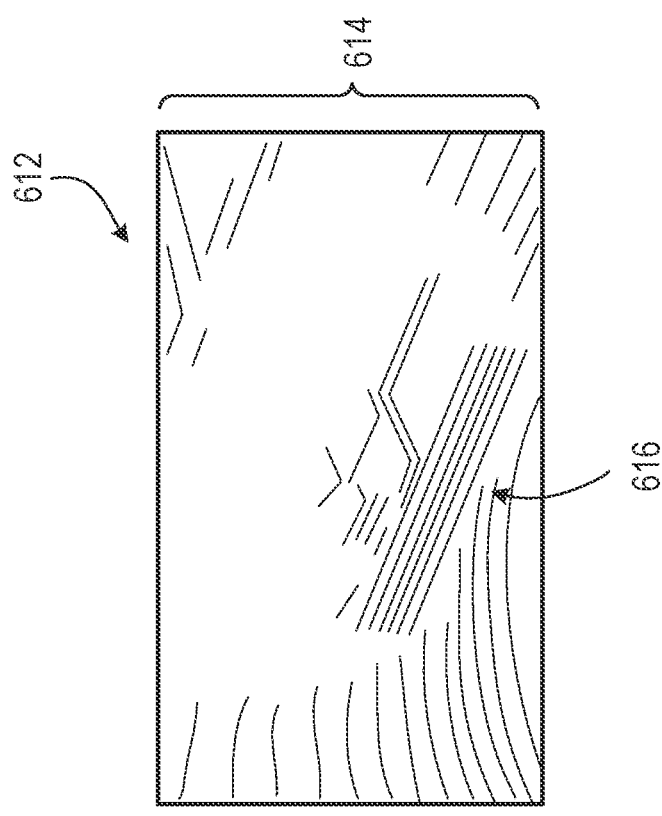
FIG. 6 shows an example of a LiDAR system.

FIG. 6 shows an example of a LiDAR system 602 (e.g., the input 502a shown in FIG. 5). The LiDAR system 602 emits light 604a-c from a light emitter 606 (e.g., a laser transmitter). Light emitted by a LiDAR system is typically not in the visible spectrum; for example, infrared light is often used. Some of the light 604b emitted encounters a physical object 608 (e.g., a vehicle) and reflects back to the LiDAR system 602. (Light emitted from a LiDAR system typically does not penetrate physical objects, e.g., physical objects in solid form.) The LiDAR system 602 also has one or more light detectors 610, which detect the reflected light. In an embodiment, one or more data processing systems associated with the LiDAR system generates an image 612 representing the field of view 614 of the LiDAR system. The image 612 includes information that represents the boundaries 616 of a physical object 608. In this way, the image 612 is used to determine the boundaries 616 of one or more physical objects near an AV.

Figure 7:
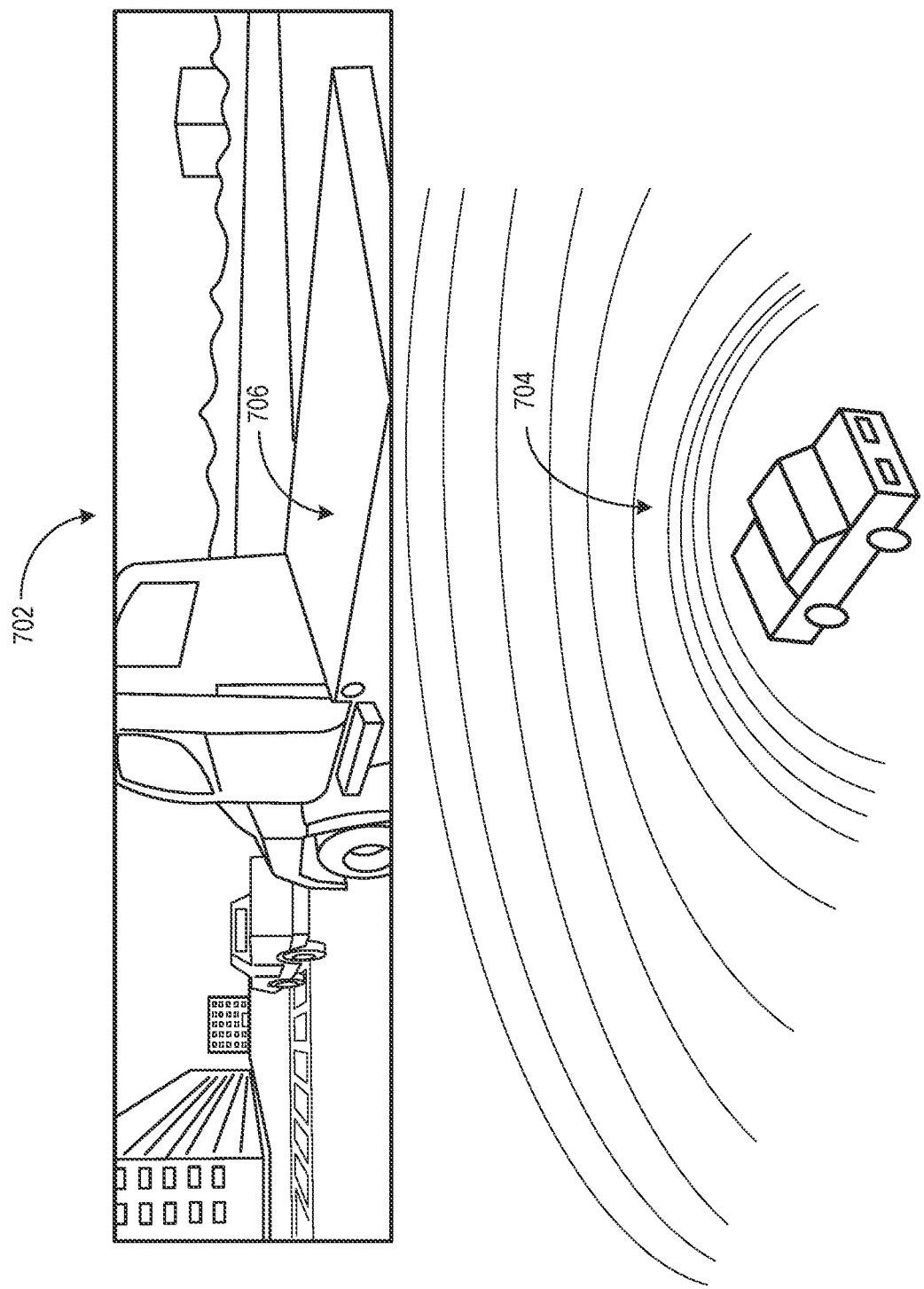
FIG. 7 shows the LiDAR system in operation.

FIG. 7 shows the LiDAR system 602 in operation. In the scenario shown in this figure, the AV 100 receives both camera system output 504c in the form of an image 702 and LiDAR system output 504a in the form of LiDAR data points 704. In use, the data processing systems of the AV 100 compares the image 702 to the data points 704. In particular, a physical object 706 identified in the image 702 is also identified among the data points 704. In this way, the AV 100 perceives the boundaries of the physical object based on the contour and density of the data points 704.

Figure 8:
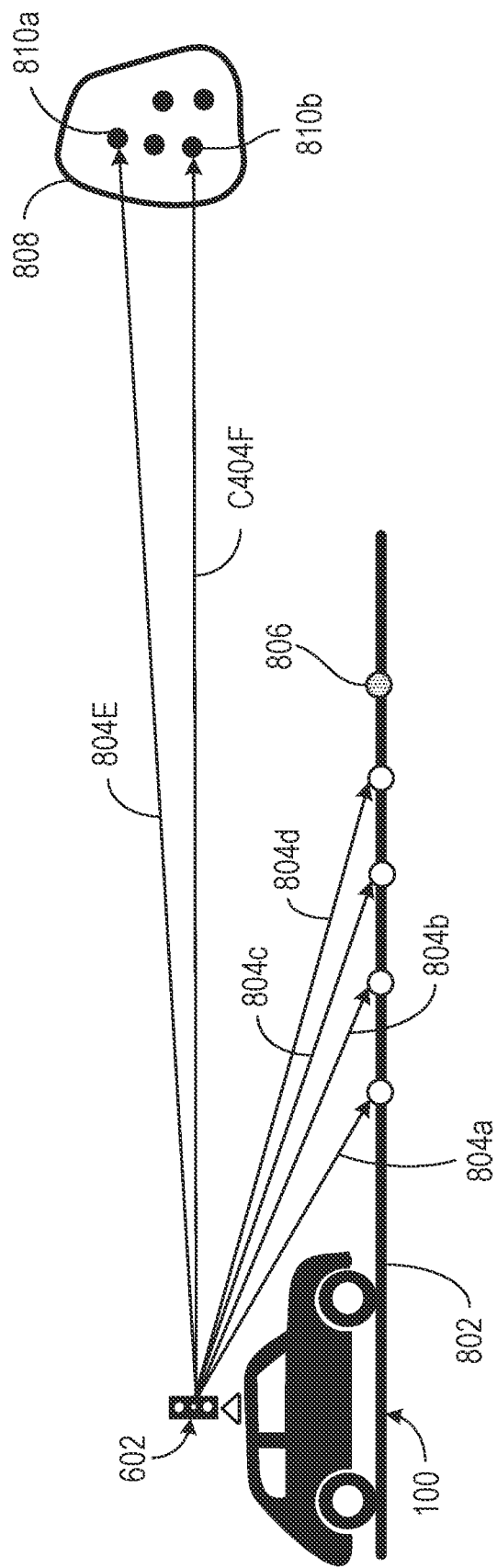
FIG. 8 shows the operation of the LiDAR system in additional detail.

FIG. 8 shows the operation of the LiDAR system 602 in additional detail. As described above, the AV 100 detects the boundary of a physical object based on characteristics of the data points detected by the LiDAR system 602. As shown in FIG. 8, a flat object, such as the ground 802, will reflect light 804a-d emitted from a LiDAR system 602 in a consistent manner. Put another way, because the LiDAR system 602 emits light using consistent spacing, the ground 802 will reflect light back to the LiDAR system 602 with the same consistent spacing. As the AV 100 travels over the ground 802, the LiDAR system 602 will continue to detect light reflected by the next valid ground point 806 if nothing is obstructing the road. However, if an object 808 obstructs the road, light 804e-f emitted by the LiDAR system 602 will be reflected from points 810a-b in a manner inconsistent with the expected consistent manner. From this information, the AV 100 can determine that the object 808 is present.

Path Planning

Figure 9:
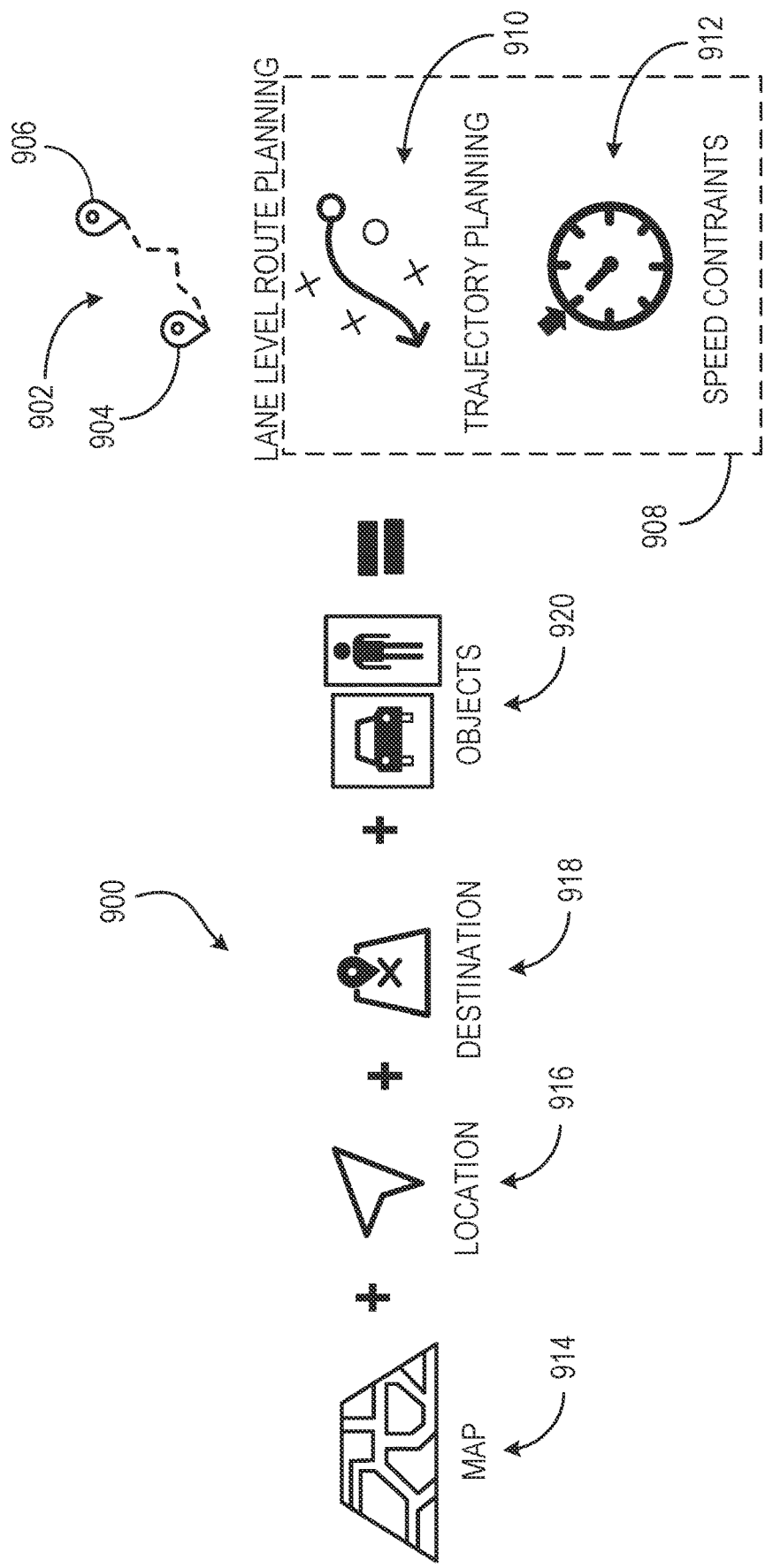
FIG. 9 shows a block diagram of the relationships between inputs and outputs of a planning module.

FIG. 9 shows a block diagram 900 of the relationships between inputs and outputs of a planning module 404 (e.g., as shown in FIG. 4). In general, the output of a planning module 404 is a route 902 from a start point 904 (e.g., source location or initial location), and an end point 906 (e.g., destination or final location). The route 902 is typically defined by one or more segments. For example, a segment is a distance to be traveled over at least a portion of a street, road, highway, driveway, or other physical area appropriate for automobile travel. In some examples, e.g., if the AV 100 is an off-road capable vehicle such as a four-wheel-drive (4WD) or all-wheel-drive (AWD) car, SUV, pick-up truck, or the like, the route 902 includes "off-road" segments such as unpaved paths or open fields.

In addition to the route 902, a planning module also outputs lane-level route planning data 908. The lane-level route planning data 908 is used to traverse segments of the route 902 based on conditions of the segment at a particular time. For example, if the route 902 includes a multi-lane highway, the lane-level route planning data 908 includes trajectory planning data 910 that the AV 100 can use to choose a lane among the multiple lanes, e.g., based on whether an exit is approaching, whether one or more of the lanes have other vehicles, or other factors that vary over the course of a few minutes or less. Similarly, in some implementations, the lane-level route planning data 908 includes speed constraints 912 specific to a segment of the route 902. For example, if the segment includes pedestrians or unexpected traffic, the speed constraints 912 may limit the AV 100 to a travel speed slower than an expected speed, e.g., a speed based on speed limit data for the segment.

In an embodiment, the inputs to the planning module 404 includes database data 914 (e.g., from the database module 410 shown in FIG. 4), current location data 916 (e.g., the AV position 418 shown in FIG. 4), destination data 918 (e.g., for the destination 412 shown in FIG. 4), and object data 920 (e.g., the classified objects 416 as perceived by the perception module 402 as shown in FIG. 4). In some embodiments, the database data 914 includes rules used in planning. Rules are specified using a formal language, e.g., using Boolean logic. In any given situation encountered by the AV 100, at least some of the rules will apply to the situation. A rule applies to a given situation if the rule has conditions that are met based on information available to the AV 100, e.g., information about the surrounding environment. Rules can have priority. For example, a rule that says, "if the road is a freeway, move to the leftmost lane" can have a lower priority than "if the exit is approaching within a mile, move to the rightmost lane."

Figure 10:
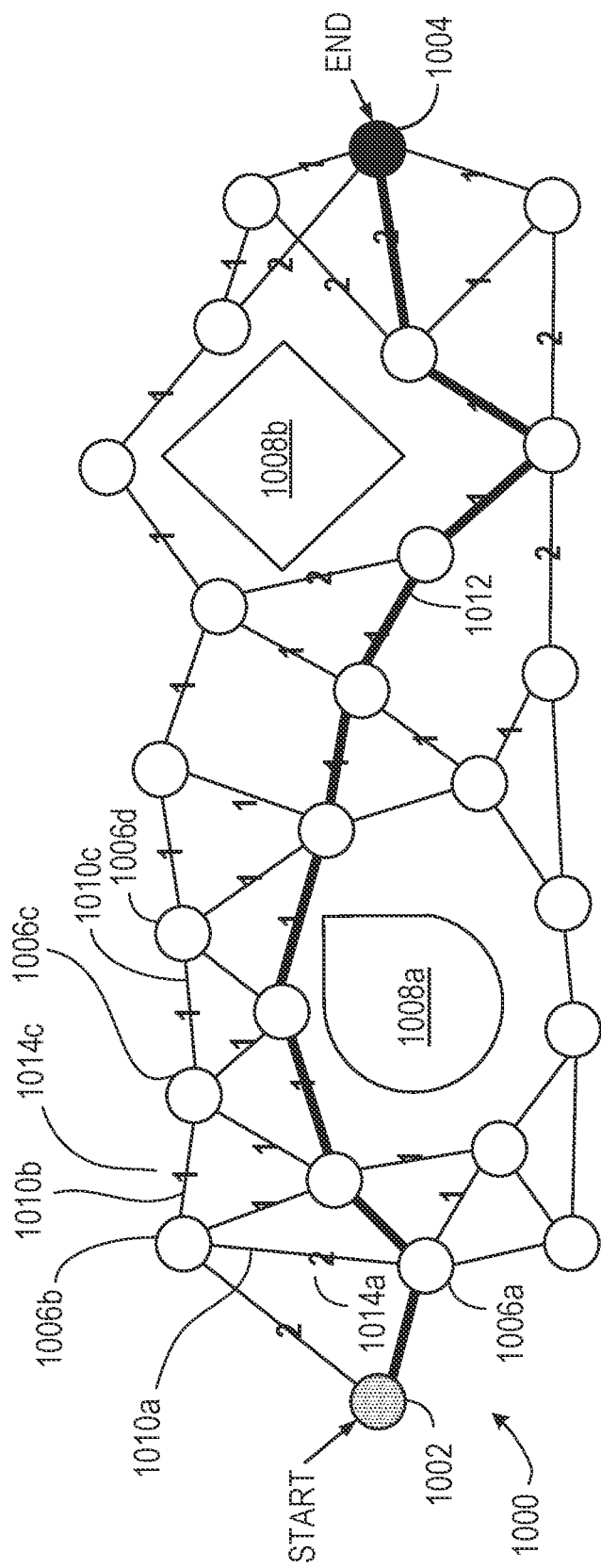
FIG. 10 shows a directed graph used in path planning.

FIG. 10 shows a directed graph 1000 used in path planning, e.g., by the planning module 404 (FIG. 4). In general, a directed graph 1000 like the one shown in FIG. 10 is used to determine a path between any start point 1002 and end point 1004. In real-world terms, the distance separating the start point 1002 and end point 1004 may be relatively large (e.g, in two different metropolitan areas) or may be relatively small (e.g., two intersections abutting a city block or two lanes of a multi-lane road).

In an embodiment, the directed graph 1000 has nodes 1006a-d representing different locations between the start point 1002 and the end point 1004 that could be occupied by an AV 100. In some examples, e.g., when the start point 1002 and end point 1004 represent different metropolitan areas, the nodes 1006a-d represent segments of roads. In some examples, e.g., when the start point 1002 and the end point 1004 represent different locations on the same road, the nodes 1006a-d represent different positions on that road. In this way, the directed graph 1000 includes information at varying levels of granularity. In an embodiment, a directed graph having high granularity is also a subgraph of another directed graph having a larger scale. For example, a directed graph in which the start point 1002 and the end point 1004 are far away (e.g., many miles apart) has most of its information at a low granularity and is based on stored data, but also includes some high granularity information for the portion of the graph that represents physical locations in the field of view of the AV 100.

The nodes 1006a-d are distinct from objects 1008a-b which cannot overlap with a node. In an embodiment, when granularity is low, the objects 1008a-b represent regions that cannot be traversed by automobile, e.g., areas that have no streets or roads. When granularity is high, the objects 1008a-b represent physical objects in the field of view of the AV 100, e.g., other automobiles, pedestrians, or other entities with which the AV 100 cannot share physical space. In an embodiment, some or all of the objects 1008a-b are a static objects (e.g., an object that does not change position such as a street lamp or utility pole) or dynamic objects (e.g., an object that is capable of changing position such as a pedestrian or other car).

The nodes 1006*a*-*d* are connected by edges 1010*a*-*c*. If two nodes 1006*a*-*b* are connected by an edge 1010*a*, it is possible for an AV 100 to travel between one node 1006*a* and the other node 1006*b*, e.g., without having to travel to an intermediate node before arriving at the other node 1006*b*. (When we refer to an AV 100 traveling between nodes, we mean that the AV 100 travels between the two physical positions represented by the respective nodes.) The edges 1010*a*-*c* are often bidirectional, in the sense that an AV 100 travels from a first node to a second node, or from the second node to the first node. In an embodiment, edges 1010*a*-*c* are unidirectional, in the sense that an AV 100 can travel from a first node to a second node, however the AV 100 cannot travel from the second node to the first node. Edges 1010*a*-*c* are unidirectional when they represent, for example, one-way streets, individual lanes of a street, road, or highway, or other features that can only be traversed in one direction due to legal or physical constraints.

In an embodiment, the planning module 404 uses the directed graph 1000 to identify a path 1012 made up of nodes and edges between the start point 1002 and end point 1004.

An edge 1010*a*-*c* has an associated cost 1014*a*-*b*. The cost 1014*a*-*b* is a value that represents the resources that will be expended if the AV 100 chooses that edge. A typical resource is time. For example, if one edge 1010*a* represents a physical distance that is twice that as another edge 1010*b*, then the associated cost 1014*a* of the first edge 1010*a* may be twice the associated cost 1014*b* of the second edge 1010*b*. Other factors that affect time include expected traffic, number of intersections, speed limit, etc. Another typical resource is fuel economy. Two edges 1010*a*-*b* may represent the same physical distance, but one edge 1010*a* may require more fuel than another edge 1010*b*, e.g., because of road conditions, expected weather, etc.

When the planning module 404 identifies a path 1012 between the start point 1002 and end point 1004, the planning module 404 typically chooses a path optimized for cost, e.g., the path that has the least total cost when the individual costs of the edges are added together.

Autonomous Vehicle Control

Figure 11:
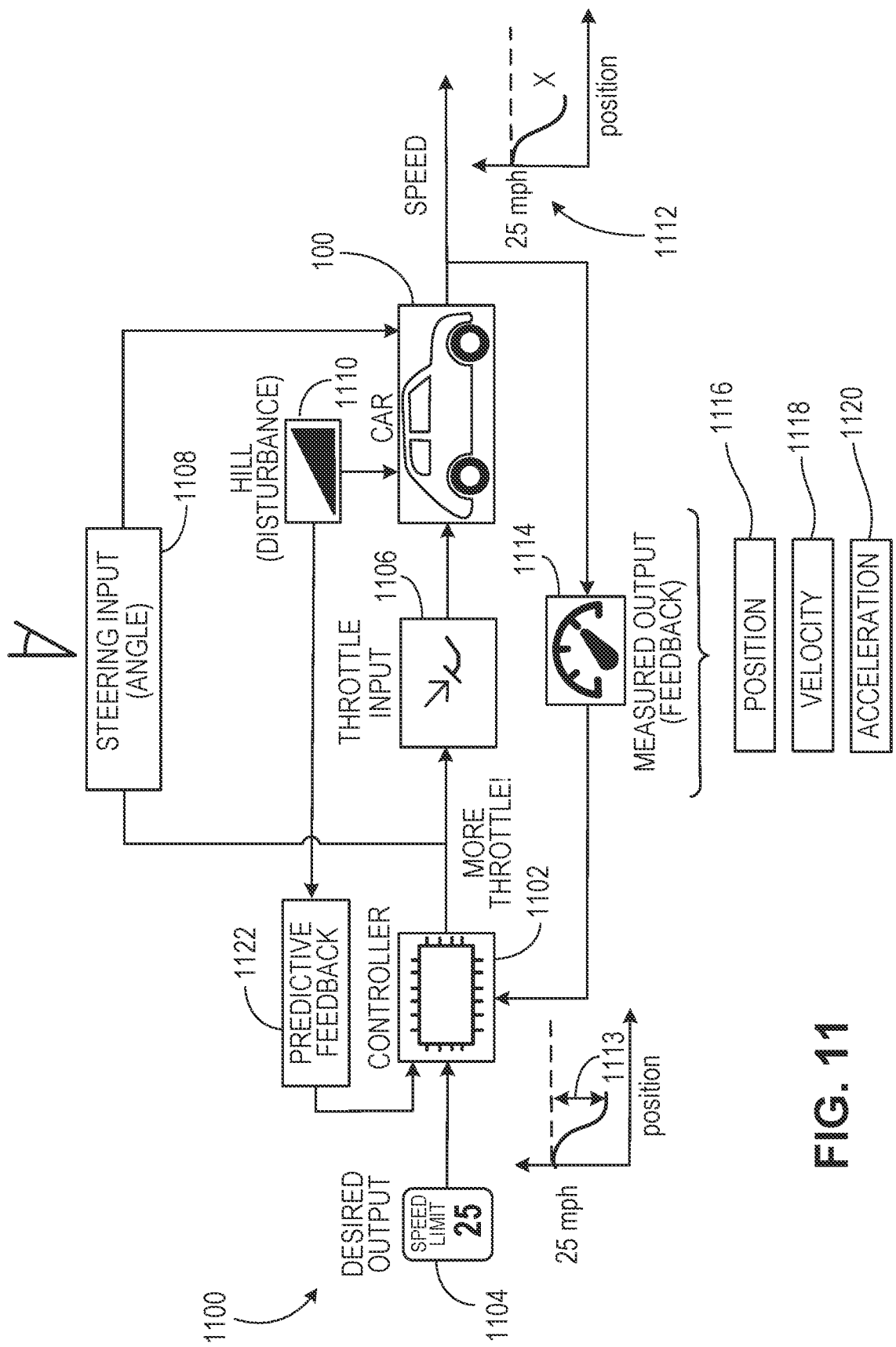
FIG. 11 shows a block diagram of the inputs and outputs of a control module.

FIG. 11 shows a block diagram 1100 of the inputs and outputs of a control module 406 (e.g., as shown in FIG. 4). A control module operates in accordance with a controller 1102 which includes, for example, one or more processors (e.g., one or more computer processors such as microprocessors or microcontrollers or both) similar to processor 304, short-term and/or long-term data storage (e.g., memory random-access memory or flash memory or both) similar to main memory 306, ROM 308, and storage device 210, and instructions stored in memory that carry out operations of the controller 1102 when the instructions are executed (e.g., by the one or more processors).

In an embodiment, the controller 1102 receives data representing a desired output 1104. The desired output 1104 typically includes a velocity, e.g., a speed and a heading. The desired output 1104 can be based on, for example, data received from a planning module 404 (e.g., as shown in FIG. 4). In accordance with the desired output 1104, the controller 1102 produces data usable as a throttle input 1106 and a steering input 1108. The throttle input 1106 represents the magnitude in which to engage the throttle (e.g., acceleration control) of an AV 100, e.g., by engaging the steering pedal, or engaging another throttle control, to achieve the desired output 1104. In some examples, the throttle input 1106 also includes data usable to engage the brake (e.g., deceleration control) of the AV 100. The steering input 1108 represents a steering angle, e.g., the angle at which the steering control (e.g., steering wheel, steering angle actuator, or other functionality for controlling steering angle) of the AV should be positioned to achieve the desired output 1104.

In an embodiment, the controller 1102 receives feedback that is used in adjusting the inputs provided to the throttle and steering. For example, if the AV 100 encounters a disturbance 1110, such as a hill, the measured speed 1112 of the AV 100 is lowered below the desired output speed. In an embodiment, any measured output 1114 is provided to the controller 1102 so that the necessary adjustments are performed, e.g., based on the differential 1113 between the measured speed and desired output. The measured output 1114 includes measured position 1116, measured velocity 1118, (including speed and heading), measured acceleration 1120, and other outputs measurable by sensors of the AV 100.

In an embodiment, information about the disturbance 1110 is detected in advance, e.g., by a sensor such as a camera or LiDAR sensor, and provided to a predictive feedback module 1122. The predictive feedback module 1122 then provides information to the controller 1102 that the controller 1102 can use to adjust accordingly. For example, if the sensors of the AV 100 detect ("see") a hill, this information can be used by the controller 1102 to prepare to engage the throttle at the appropriate time to avoid significant deceleration.

Figure 12:
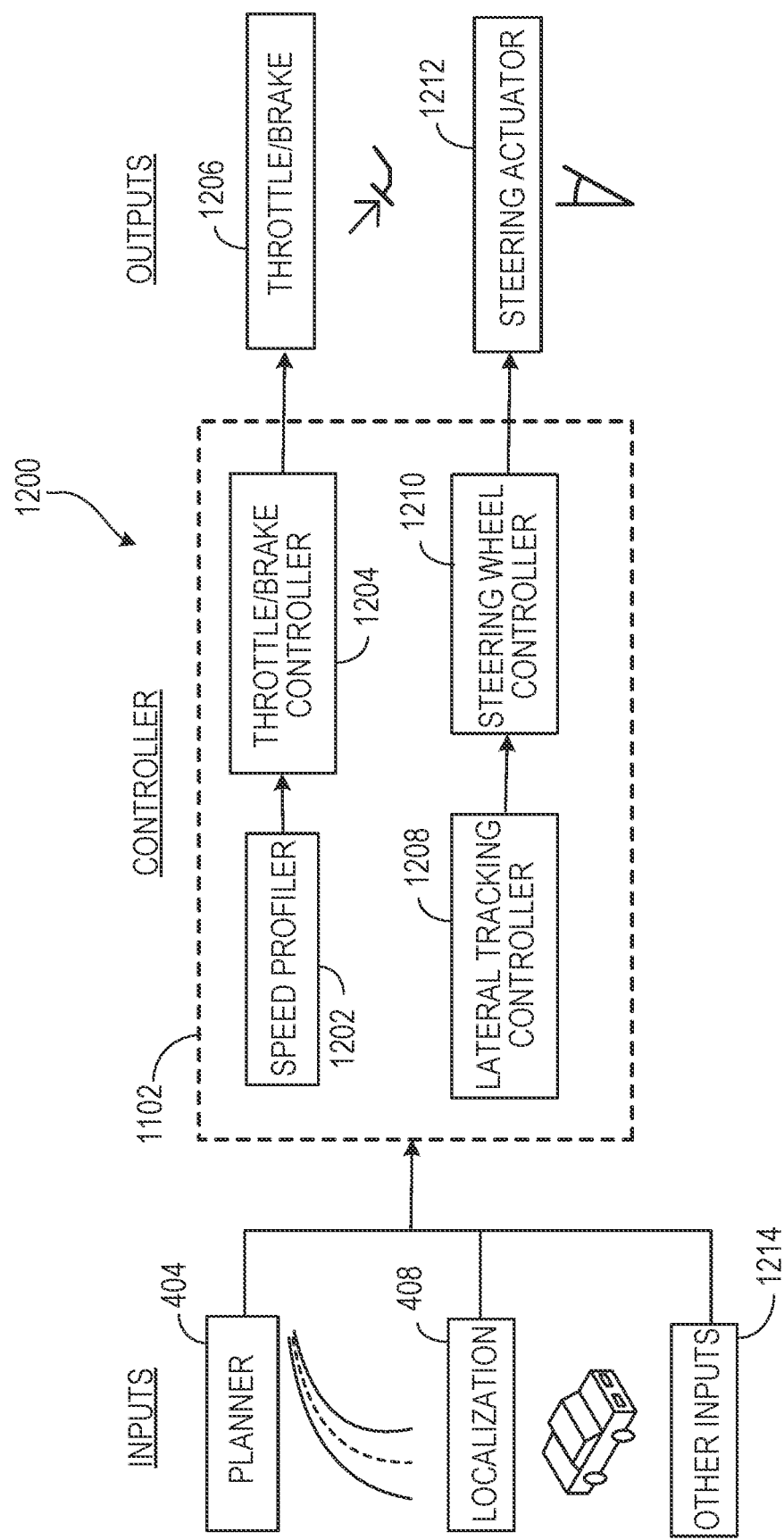
FIG. 12 shows a block diagram of the inputs, outputs, and components of a controller.

FIG. 12 shows a block diagram 1200 of the inputs, outputs, and components of the controller 1102. The controller 1102 has a speed profiler 1202 which affects the operation of a throttle/brake controller 1204. For example, the speed profiler 1202 instructs the throttle/brake controller 1204 to engage acceleration or engage deceleration using the throttle/brake 1206 depending on, e.g., feedback received by the controller 1102 and processed by the speed profiler 1202.

The controller 1102 also has a lateral tracking controller 1208 which affects the operation of a steering controller 1210. For example, the lateral tracking controller 1208 instructs the steering controller 1210 to adjust the position of the steering angle actuator 1212 depending on, e.g., feedback received by the controller 1102 and processed by the lateral tracking controller 1208.

The controller 1102 receives several inputs used to determine how to control the throttle/brake 1206 and steering angle actuator 1212. A planning module 404 provides information used by the controller 1102, for example, to choose a heading when the AV 100 begins operation and to determine which road segment to traverse when the AV 100 reaches an intersection. A localization module 408 provides information to the controller 1102 describing the current location of the AV 100, for example, so that the controller 1102 can determine if the AV 100 is at a location expected based on the manner in which the throttle/brake 1206 and steering angle actuator 1212 are being controlled. In an embodiment, the controller 1102 receives information from other inputs 1214, e.g., information received from databases, computer networks, etc.

Computer System for Automated Object Annotation

Figure 13:
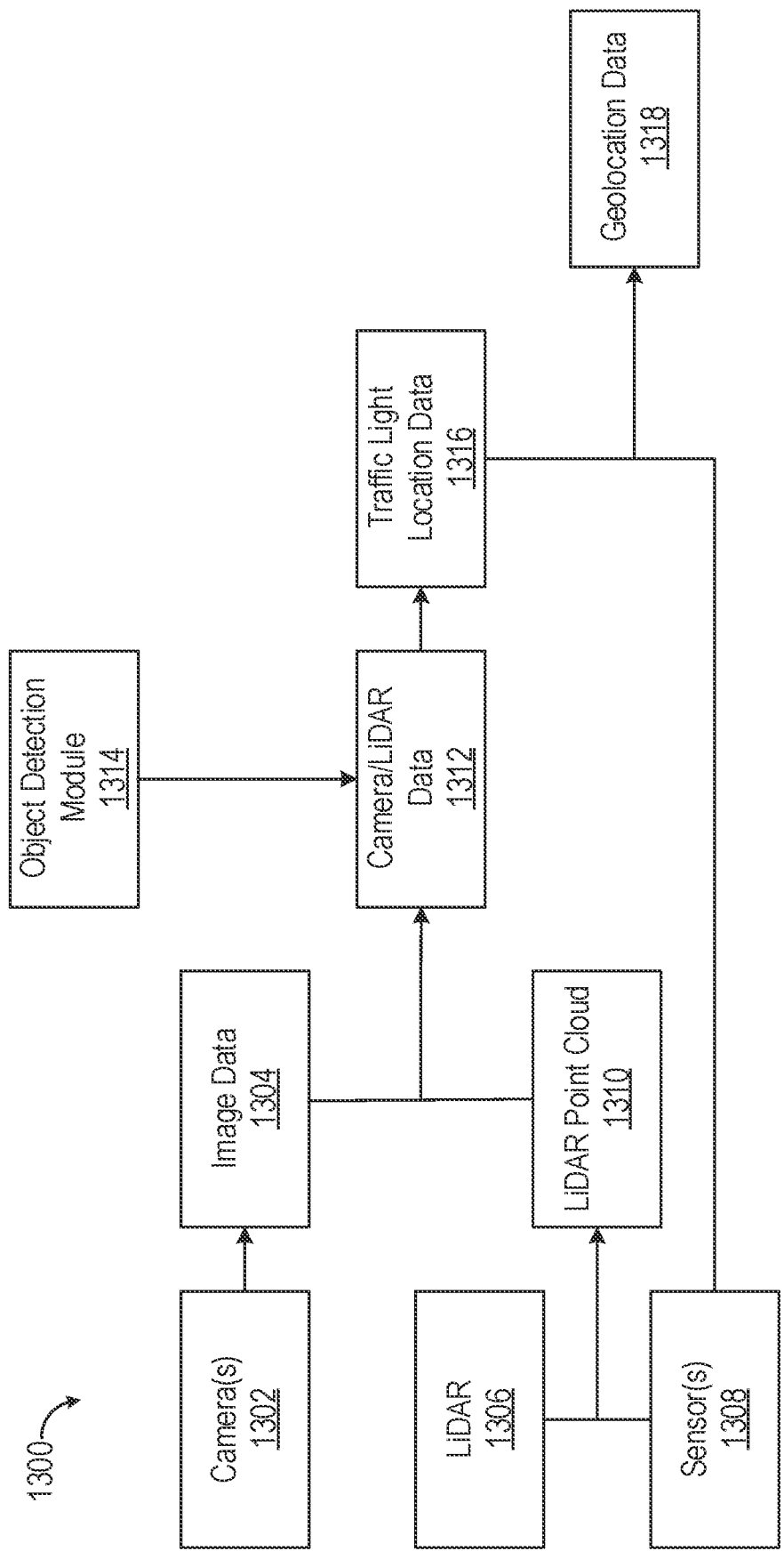
FIG. 13 shows an example architecture of a computer system for performing automated object annotation for map data used for navigating a vehicle.

FIG. 13 shows an example architecture of a computer system 1300 for performing automated object annotation for map data used for navigating a vehicle. System 1300 is configured as an automated annotation pipeline to extract three-dimensional poses of objects and register them in map data for an AV (e.g., AV 100) using data from an autonomous vehicle log having camera data (image data), LiDAR data, and vehicle pose data. In the embodiments disclosed herein, system 1300 uses a sensor fusion technique in which image data obtained for an environment around the AV is integrated with LiDAR data obtained for the environment. System 1300 then performs object detection on the image data contained in the integrated dataset to detect one or more target objects. System 1300 then extracts LiDAR data points corresponding to the detected target objects to provide three-dimensional pose data for the detected target objects, which system 1300 then registers in the map data used for navigating the AV. In the example embodiments disclosed herein, the target object is a traffic control unit such as a traffic light, and the pose data for the traffic light indicates a three-dimensional orientation/position (e.g., a longitude, latitude, height, yaw, pitch, roll) of the traffic light in the environment. This information is registered in the map data so that the traffic lights and, in some embodiments, their current status (e.g., red, yellow, green, etc.) can be more easily recognized by the AV when navigating the environment. For example, the annotated traffic light pose data can provide a known region of interest for detection that reduces the image field that would otherwise be scanned in order to detect the traffic light. Additionally, the annotated region of interest reduces the risk of detection error (e.g., failing to detect the traffic light, false positive detection, etc.), especially in harsh lighting conditions. Accordingly, annotation of the traffic lights makes the traffic light detection more robust, particularly when being performed in real time. While the embodiments provided herein discuss use of the disclosed system and technique for detecting a traffic light, the disclosed technique can be used to detect other objects in the environment such as, for example, street signs, speed limit signs, stop signs, or other objects that are generally static and consistently present in the environment.

In some embodiments, computer system 1300 can include one or more components located on the AV (e.g., AV 100). In some embodiments, system 1300 can be part of a larger computing system that algorithmically generates control actions based on real-time sensor data and prior information, allowing the vehicle to execute autonomous driving capabilities. In some embodiments, system 1300 can be implemented in a similar manner as the computing devices 146 located on the AV 100 described with respect to FIG. 1.

As shown in FIG. 13, system 1300 includes one or more cameras 1302 (e.g., similar to cameras 122, camera system 502c, or TLD system 502d) configured to produce image data 1304 (e.g., similar to camera data 504c or TLD data 504d). In some embodiments, cameras 1302 can be mounted on AV 100 and configured to record image data of at least a portion of the environment surrounding AV 100 as AV 100 is navigated along a road. In some embodiments, cameras 1302 can include a number of cameras to generate a partial view (e.g., less than 360 degrees) or, optionally, a full view (e.g., 360 degrees) of the environment surrounding AV 100, which is represented in image data 1304.

Figure 14:
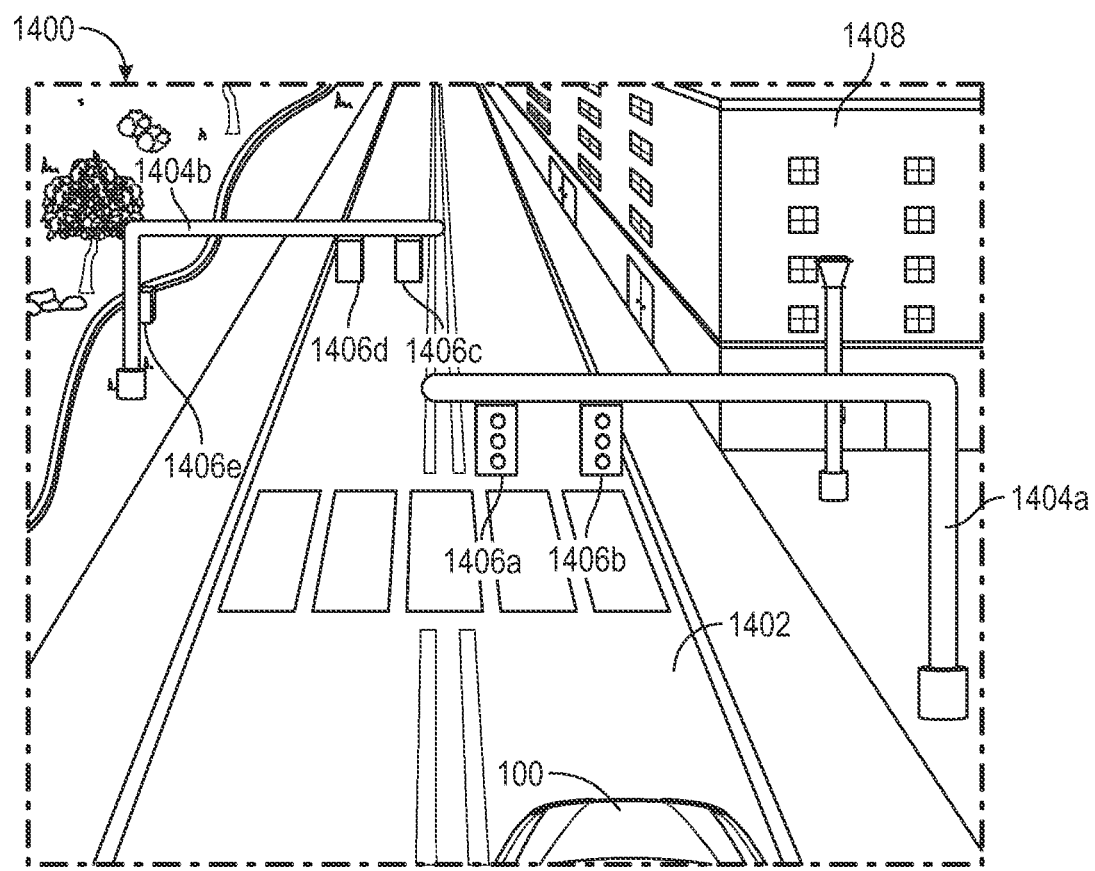
FIG. 14 shows an example representation of image data.

FIG. 14 illustrates an example representation of image frame 1400, which is an image frame in image data 1304 that is captured using cameras 1302 while operating AV 100. Image frame 1400 includes a representation of the environment around AV 100, including road 1402, traffic light poles 1404a and 1404b, traffic lights 1406a-1406e, and building 1408. In the embodiment shown in FIG. 14, image frame 1400 is a frame of the image data obtained using camera 1302 while AV 100 has a particular vehicle pose while navigating along road 1402.

Referring again to FIG. 13, system 1300 further includes LiDAR 1306 (e.g., similar to LiDAR 123, LiDAR input 502a, or LiDAR system 602) configured to produce LiDAR data (e.g., similar to LiDAR output 504a). In some embodiments, LiDAR 1306 can be mounted on AV 100 and is configured to obtain LiDAR data points corresponding to physical objects in the environment surrounding AV 100 as AV 100 is navigated along a road. LiDAR data can be used to construct at least a portion of the physical environment around AV 100 by providing a depth value (relative to LiDAR 1306) for items present in the environment and represented using the LiDAR data. In the embodiments disclosed herein, this includes providing a depth value for traffic lights, as will be discussed in greater detail below.

System 1300 also includes AV position sensors 1308 (e.g., similar to sensors 121), which produce pose data for AV 100. The pose data provides an indication of a three-dimensional position/orientation of AV 100 in the environment (e.g., the AV's position, linear and angular velocity, acceleration, heading, etc.). In some embodiments, this pose data is used to anchor and/or determine a relative location of objects in the environment with respect to AV 100 (and, optionally, components of system 1300 such as camera 1302 and LiDAR 1306).

As shown in FIG. 13, system 1300 combines the LiDAR data with the pose data for AV 100 to produce a localized LiDAR point cloud map 1310, which orients the LiDAR data cloud relative, in some embodiments, to the position of AV 100. In some embodiments, this produces an aggregation of the LiDAR data and vehicle pose data by accumulating LiDAR scans in keyframes (e.g., every 50 frames of LiDAR data) to form a local point cloud for each vehicle pose. For example, in some embodiments, LiDAR point cloud 1310 is an aggregation of the LiDAR data from current keyframe LiDAR data and several (e.g. 50) previous keyframes.

In order to accumulate LiDAR scans from current and previous keyframes in the same coordinates, vehicle pose data (e.g., from sensors 1308) is used to convert the LiDAR data in previous frame coordinates into the current keyframe coordinates. In some embodiments, the collected data includes a location component that is relative to the position of AV 100. The resulting aggregated LiDAR data in the current keyframe is, therefore, a combination of all LiDAR scans from the current and previous keyframes (e.g., the previous 50 keyframes), represented using the same coordinates as the current vehicle pose (e.g., with AV 100 as the center of the data). In some embodiments, the vehicle pose data generated by sensors 1308 is represented in a global coordinate system. In some embodiments, the data is represented in a coordinate system with AV 100 as the point of origin or the center of the collected data points. In some embodiments, the point cloud model of the physical environment is generated in real time as AV 100 navigates the environment.

As shown in FIG. 13, the localized LiDAR point cloud map 1310 is fused with image data 1304 to produce camera/LiDAR fused data 1312. In some embodiments, the fusion process includes projecting the LiDAR point cloud map 1310 onto the image frames in image data 1304 (e.g., including synchronizing the data using timestamps) to generate a combined data set that includes image data and a localized LiDAR point cloud for each pose of AV 100. As a result, each keyframe has pose information, LiDAR data, and image data, with each of these associated with a timestamp. In some embodiments, the aggregated LiDAR data and image data in a current keyframe are represented in the coordinates of the current keyframe.

LiDAR produces a denser point cloud that enables more accurate detection and identification of objects (e.g., such as traffic lights) than would otherwise be achievable using other remote sensing methods such as, for example, RADAR. In some instances, LiDAR also provides for easier object detection than can be achieved using image data alone. However, in some instances, image data can provide for more accurate object identification. Thus, by using a combination of LiDAR data and image data (camera/LiDAR fused data 1312), the disclosed techniques exploit the object identification benefits of the image data and the object position information (e.g., including depth and pose information) of the LiDAR data (e.g., LiDAR point cloud map 1310) to optimize a solution for performing automated object annotation for objects represented in the camera/LiDAR fused data 1312.

Figure 15:
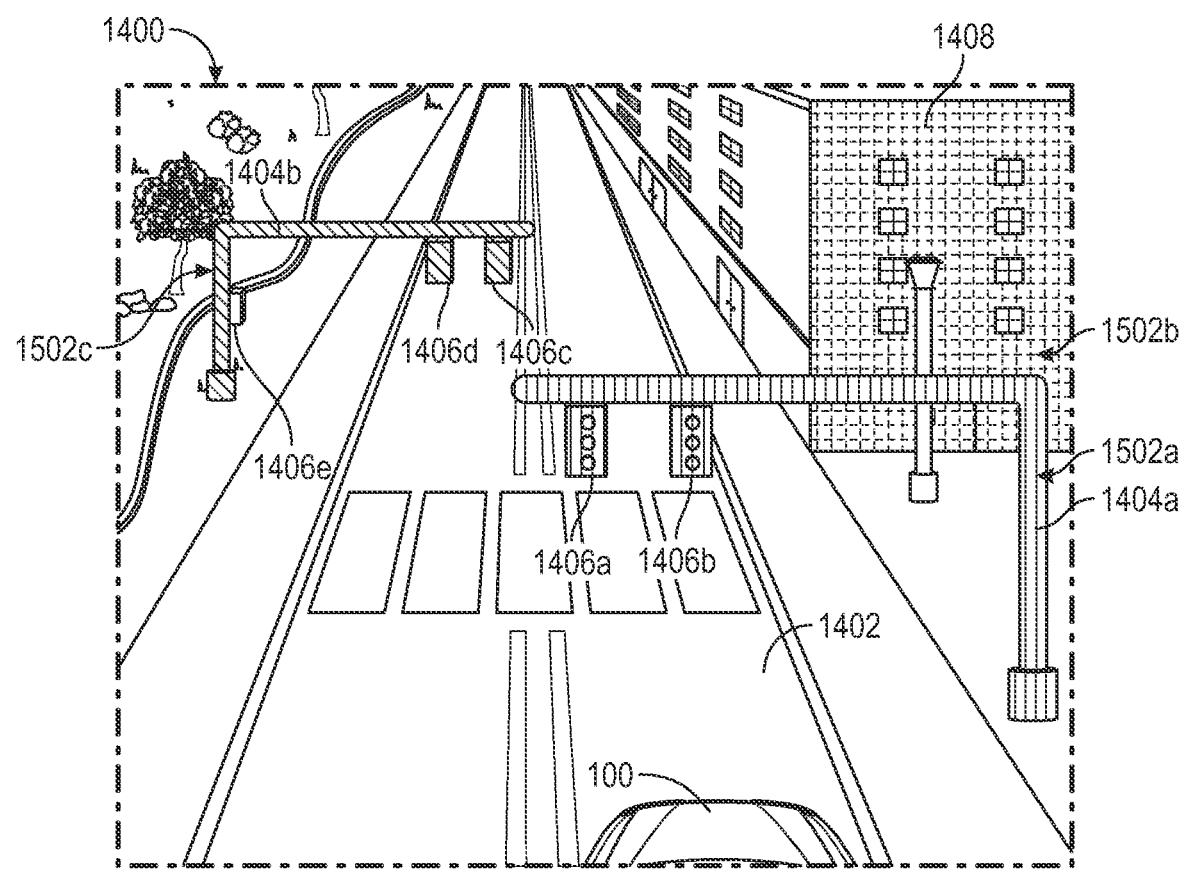
FIG. 15 shows an example representation of camera/LiDAR fused data.

FIG. 15 illustrates an example representation of the camera/LiDAR fused data 1312. As shown in FIG. 15, LiDAR data 1502 is applied to image frame 1400 to illustrate the fusion of the depth and pose data of LiDAR point cloud map 1310 with image data 1304 for the vehicle pose represented in image frame 1400. In FIG. 15, LiDAR data 1502 is shown having different appearances to illustrate different depth values represented by the LiDAR data. For example, LiDAR data 1502a represents LiDAR data having a low depth value, meaning the LiDAR data 1502a corresponds to physical objects having a short depth relative to AV 100 (or LiDAR 1306). In this example, LiDAR data 1502a provides depth and three-dimensional pose information for traffic lights 1406a and 1406b and traffic light pole 1404a, which are located a short distance from AV 100. LiDAR data 1502b corresponds to building 1408 and, thus, provides depth and pose information for building 1408. LiDAR data 1502b represents LiDAR data having a greater depth than LiDAR data 1502a. Accordingly, building 1408 is located a farther distance from AV 100 than traffic lights 1406a and 1406b and traffic light pole 1404a. Finally, LiDAR data 1502c corresponds to traffic lights 1406c-1406e and traffic light pole 1404b and, thus, provides depth and pose information for traffic lights 1406c-1406e and traffic light pole 1404b. LiDAR data 1502c represents LiDAR data having a greater depth than LiDAR data 1502b. Accordingly, traffic lights 1406c-1406e and traffic light pole 1404b are located a farther distance from AV 100 than traffic lights 1406a and 1406b, traffic light pole 1404a, and building 1408. It should be understood that the illustration of LiDAR data in FIG. 15 is simplified by only showing the LiDAR data at specific locations (e.g., 1502a-1502c) in order to maintain clarity of the figure while also illustrating the concept of the fused LiDAR data and image data.

Referring again to FIG. 13, system 1300 further includes object detection module 1314 for performing object detection on camera/LiDAR fused data 1312. In some embodiments, object detection module 1314 includes a machine learning network such as, for example, a neural network, that is configured to perform object recognition on the image data in camera/LiDAR fused data 1312 to identify the presence of target objects in the camera/LiDAR fused data 1312. For example, in some embodiments, object detection module 1314 analyzes the image data in camera/LiDAR fused data 1312 to identify traffic lights.

Figure 16:
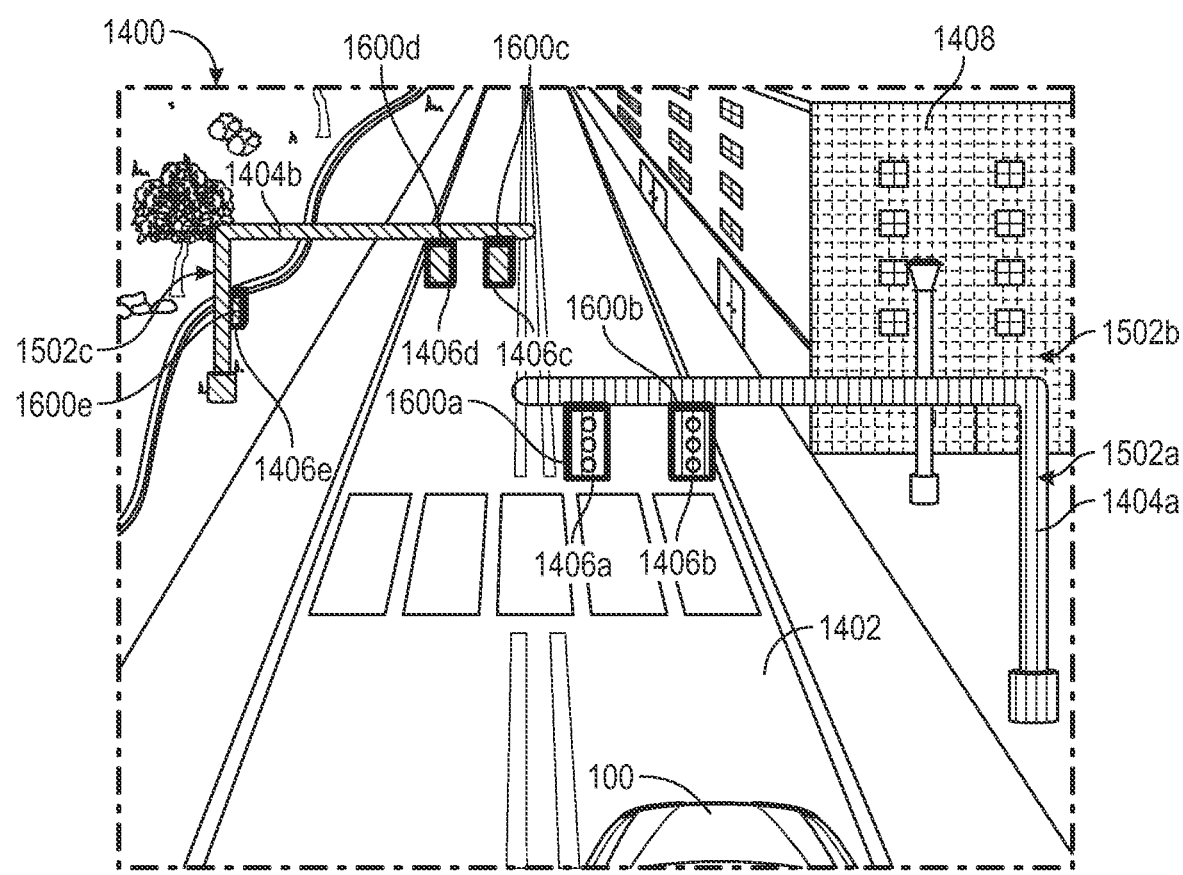
FIG. 16 shows a representation of camera/LiDAR fused data with object annotation.

In some embodiments, object detection module 1314 also annotates camera/LiDAR fused data 1312 to indicate the identified traffic lights. For example, FIG. 16 shows image frame 1400 as previously illustrated in FIG. 15, but with bounding boxes 1600a-1600e displayed on identified traffic lights 1406a-1406e, respectively. In some embodiments, bounding boxes 1600a-1600e are three-dimensional objects that represent the location and three-dimensional position/orientation of the identified traffic lights.

Referring again to FIG. 13, system 1300 extracts, from camera/LiDAR fused data 1312, LiDAR data points that correspond to the locations of the identified traffic lights in the coordinates of the current keyframe (e.g., having pose data relative to the vehicle coordinates). These extracted LiDAR data points are represented in FIG. 13 as traffic light location data 1316. In some embodiments, traffic light location data 1316 includes the point cloud data and the three-dimensional pose information (e.g., in the form of bounding boxes) for the identified traffic lights relative to the coordinates of AV 100.

In some embodiments, AV position sensors 1308 produce global coordinates for the vehicle pose data. Accordingly, in such embodiments, system 1300 combines traffic light location data 1316 with the pose data for AV 100 (from AV position sensors 1308) to convert the point cloud data and bounding boxes of traffic light location data 1316 to a global coordinate system (e.g., assigning the data points of the traffic light location data to a respective latitude, longitude, height, etc.). This is represented in FIG. 13 as traffic light geolocation data 1318. Therefore, traffic light geolocation data 1318 represents, in a global coordinate system, the cloud point data and the three-dimensional pose information (in the form of bounding boxes) for the traffic lights identified by object detection module 1314.

In some embodiments, system 1300 analyzes traffic light location data 1316 and/or traffic light geolocation data 1318 to determine whether the data should be used to enhance the map data used to navigate AV 100. Specifically, in some embodiments, system 1300 analyzes traffic light location data 1316 and/or traffic light geolocation data 1318 to determine whether the location and/or pose data for each identified traffic light meets registration criteria—that is, whether the location (e.g., relative to the location of AV 100) and, optionally, pose data meet a standard that suggests the object detection module 1314 accurately identified the object as the intended object (e.g., a traffic light). In some embodiments, this may involve determining whether the point cloud data associated with the identified object has a location or distance (e.g., depth) value (e.g., relative to a location of AV 100) that is consistent with a range of location or distance values that are acceptable (e.g., expected) for the target object. If the point cloud data for the identified target object indicates a location or distance that is outside of this range, the system 1300 determines that the traffic light location data 1316 and/or traffic light geolocation data 1318 for that specific detected object should not be registered in the map data. Conversely, if the point cloud data for the identified target object indicates a location or distance value that is within the acceptable range, the system 1300 registers the detected target object in the map data. This may include annotating the detected object (e.g., the traffic light) in the map data such that a representation of the map includes a representation (e.g., a marker or indicator, or a representation of the bounding boxes 1600) of the traffic light (including, in some embodiments, an indication of the pose information for the traffic light).

Example Process for Performing Automated Object Annotation

Figure 17:
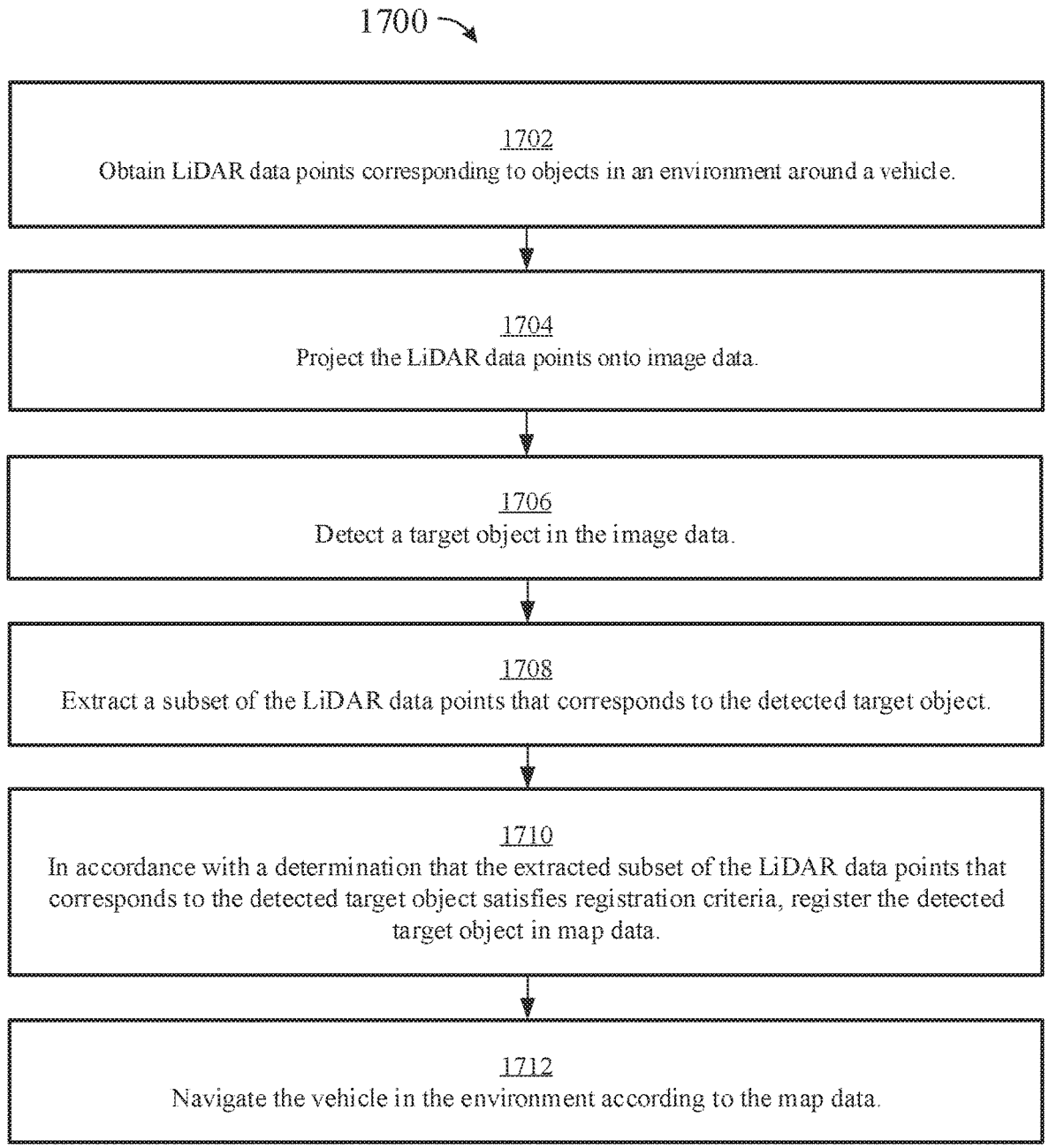
FIG. 17 is a flow chart of an example process for performing automated object annotation for map data used for navigating a vehicle.

FIG. 17 is a flow chart of an example process 1700 (also referred to as a method) for performing automated object annotation for map data used for navigating a vehicle in accordance with the embodiments discussed above. For convenience, the process 1700 will be described as being performed by a system of one or more computers located in one or more locations. For example, the computer system 1300 of FIG. 13, appropriately programmed in accordance with this specification, can perform the process 1700.

At 1702, the system (e.g., 1300) obtains, using a LiDAR (e.g., LiDAR 1306), LiDAR data points corresponding to objects in an environment around a vehicle (e.g., AV 100) (e.g., LiDAR data points that correspond to objects detected in an environment (e.g., real/physical environment) around an autonomous vehicle (e.g., a street and nearby objects such as traffic poles, traffic lights, street signs, pedestrians, cars, trees, etc.)).

In some embodiments, obtaining the LiDAR data points (e.g., 1310; 1502a-1502c) includes obtaining the LiDAR data points while navigating, using a control circuit (e.g., control module 406), the vehicle in the environment. In some embodiments, obtaining the LiDAR data points further includes: obtaining (e.g., using a processing circuit, camera images, GPS, or a combination thereof) pose data for the vehicle (e.g., data representing a position/orientation of the vehicle) while navigating the vehicle in the environment; and associating, using the processing circuit, the LiDAR data points with the pose data for the vehicle. In some embodiments, the pose data for the vehicle indicates a three-dimensional pose (e.g., a three-dimensional position/orientation) of the vehicle with respect to a geographical location in the environment. In some embodiments, the method further comprises determining, using the processing circuit, a geographical location of the detected target object based (e.g., at least in-part) on the three-dimensional pose of the vehicle. In some embodiments, the geographical location of the detected target object is a three-dimensional position of the target object in the environment. In some embodiments, the three-dimensional position of the target object is determined using the pose of the vehicle in combination with the LiDAR data points, which provide a distance (e.g., depth) and position of the target object with respect to the three-dimensional pose of the vehicle.

At 1704, the system (e.g., 1300) projects, using a processing circuit (e.g., computing processor 146), the LiDAR data points (e.g., 1502a-1502c) onto image data (e.g., image data 1304) (e.g., image data of the environment around the vehicle) (e.g., image data obtained while operating (driving/navigating/controlling) an autonomous vehicle) (e.g., image data obtained from camera(s) 1302).

In some embodiments, projecting the LiDAR data points onto the image data includes fusing the LiDAR data points (e.g., 1310) with image data (e.g., 1304) that is obtained for the environment around the vehicle (e.g., producing LiDAR point cloud map 1310). In some embodiments, the image data and the LiDAR data points are obtained during the same period of time (e.g., simultaneously). In some embodiments, this includes navigating the vehicle (e.g., AV 100) in the environment while obtaining the image data (e.g., using one or more cameras) and LiDAR data points (e.g., using the LiDAR) during the same period of time (e.g., simultaneously).

At 1706, the system (e.g., 1300) detects, using the processing circuit, a target object (e.g., 1406a-1406e) (e.g., a traffic control unit; a traffic light) in the image data (e.g., 1304).

In some embodiments, detecting the target object in the image data includes annotating the target object in the image data. In some embodiments, an annotation of the detected target object is provided in the image data in the form of a visual indication that is distinct from the image data itself. For example, the annotation can include a bounding box (e.g., 1600a-1600e) that is superimposed on the image data at a location corresponding to the detected target object (e.g., a rectangle around the detected target object) to provide a visual indication of the detected target object.

In some embodiments, process 1700 further comprises the system (e.g., 1300) determining, using the processing circuit, a three-dimensional pose of the detected target object. In some embodiments, the three-dimensional pose indicates a position of the target object including, for example, an orientation, height, and location (e.g., GPS coordinates/latitude and longitude) of the target object with respect to the real environment. In some embodiments, registering the detected target object in the map data includes representing the detected target object in the map data having the three-dimensional pose. In some embodiments, the target object is represented in the map data as a traffic light having the three-dimensional pose. In some embodiments, the representation of the target object includes an image of the target object that can be displayed with a representation of a map and having the three-dimensional pose. For example, the traffic light can be displayed in a landscape orientation, having a specific height above the street surface, and facing a particular direction (e.g., southeast).

In some embodiments, the target object is a traffic light (e.g., 1406a-1406e).

In some embodiments, detecting the target object in the image data includes using machine learning (e.g., a neural network) (e.g., object detection module 1314) to detect the target object in the image data.

At 1708, the system (e.g., 1300) extracts, using the processing circuit, a subset of the LiDAR data points (e.g., traffic light location data 1316 or traffic light geolocation data 1318) that corresponds to the detected target object. In some embodiments, extracting the subset of the LiDAR data points includes identifying respective LiDAR data points that correspond to the detected target object identified in the image data (e.g., LiDAR data points that are in the same direction (e.g., relative to an orientation of AV 100) as the detected target object). In some embodiments, the respective LiDAR data points corresponding to the detected target object (the subset of the LiDAR data points) are co-located in the image data with the detected target object. In some embodiments, the image data is used to recognize or identify a target object, and the subset of the LiDAR data that corresponds to the identified target object is used to provide location data (e.g., a distance from the AV, an orientation of the target object, a location of the target object in the environment, etc.) for the target object. In some embodiments, the locations of the LiDAR data points and the location of the detected target object are determined based on pose data for the autonomous vehicle. In some embodiments, the LiDAR data, the image data, and the pose data for the AV are synchronized such that the LiDAR data points and the corresponding image data represent data collected at a same location, time, and AV pose.

At 1710, in accordance with a determination that the extracted subset of the LiDAR data points that corresponds to the detected target object (e.g., 1316 or 1318) satisfies registration criteria (e.g., the extracted subset of LiDAR data points have a location or distance (e.g., depth) value (e.g., relative to a location of AV 100) that is less than a location or distance threshold value), the system (e.g., 1300) registers (e.g., automatically), using the processing circuit, the detected target object (e.g., a representation or indication of the detected target object (e.g., 1600a-1600e)) in map data (e.g., three-dimensional map data) (e.g., including a representation of the detected target object in the map data without requiring manual annotation of the map data).

In some embodiments, registering the detected target object in the map data includes indicating a location (e.g., a geographical location) of the detected target object in the map data (e.g., associating the detected target object with a location in the map data (e.g., a height above an intersection of two particular streets)). In some embodiments, the location of the detected target object in the map data is based on a geographical location associated with the extracted subset of the LiDAR data points (e.g., the location of the target object corresponds to the geographical location of the intersection of the two streets in the real environment corresponding to the extracted subset of the LiDAR data points).

In some embodiments, the registration criteria includes a criterion that is satisfied when the extracted subset of the LiDAR data points that corresponds to the detected target object is associated with a location or distance (e.g., depth) (e.g., distance from the vehicle) that is less than a location or distance threshold (e.g., a location or distance threshold for determining whether an object is within a predetermined location or distance from the vehicle that allows the target object to be classified as a particular object (e.g., a traffic light)). In some embodiments, the extracted subset of the LiDAR data points is a collection of data points that correspond to the detected target object, and a location or distance (e.g., depth) associated with the extracted subset of the LiDAR data points represents a location or distance of the target object (e.g., relative to the vehicle). In some embodiments, the location or distance and, optionally, a determined size of the detected target object can be evaluated to determine whether the detected target object matches a set of criteria for classifying the detected target object (e.g., for identifying the detected target object as a traffic light).

In some embodiments, process 1700 further comprises: in accordance with a determination that the extracted subset of the LiDAR data points that corresponds to the detected target object does not satisfy the registration criteria, forgoing registering the detected target object in the map data.

At 1712, the system (e.g., 1300) navigates (e.g., controls operation (e.g., driving) of the vehicle), using a control circuit (e.g., control module 406), the vehicle in the environment according to the map data.

In the foregoing description, embodiments have been described with reference to numerous specific details that may vary from implementation to implementation. The description and drawings are, accordingly, to be regarded in an illustrative rather than a restrictive sense. The sole and exclusive indicator of the scope of the claims, and what is intended by the applicants to be the scope of the claims, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further comprising," in the foregoing description or following claims, what follows this phrase can be an additional step or entity, or a sub-step/sub-entity of a previously-recited step or entity.

What is claimed is:

1. A system comprising:
   one or more computer processors; and
   one or more storage media storing instructions which, when executed by the one or more computer processors, cause performance of operations comprising:
   obtaining map data used for navigating a vehicle, wherein the map data identifies a plurality of objects in an environment of the vehicle;
   obtaining image data of an image of the environment of the vehicle, wherein the image comprises one or more objects;
   obtaining, using a LiDAR, LiDAR data points corresponding to the one or more objects;
   projecting, using a processing circuit, the LiDAR data points onto the image data to generate fused data, the fused data comprising a LiDAR data portion and an image data portion;
   detecting, using the processing circuit, a first target object and a second target object in the fused data;
   extracting, using the processing circuit, a first subset of the LiDAR data points that corresponds to the detected first target object;
   extracting, using the processing circuit, a second subset of the LiDAR data points that corresponds to the detected second target object;
   automatically annotating, using the processing circuit, the map data, wherein the automatically annotating comprises:
      in accordance with a determination that the extracted first subset of the LiDAR data points that corresponds to the detected first target object satisfies registration criteria associated with the detected first target object, automatically annotating the map data corresponding to the detected first target object, and
      in accordance with a determination that the extracted second subset of the LiDAR data points that corresponds to the detected second target object does not satisfy the registration criteria associated with the detected second target object, not annotating map data corresponding to the detected second target object; and
   navigating, using a control circuit, the vehicle in the environment according to the annotated map data.

2. The system of claim 1, wherein obtaining the LiDAR data points includes obtaining the LiDAR data points while navigating, using the control circuit, the vehicle in the environment.

3. The system of claim 2, wherein obtaining the LiDAR data points further includes:
   obtaining pose data for the vehicle while navigating the vehicle in the environment; and
   associating, using the processing circuit, the LiDAR data points with the pose data for the vehicle.

4. The system of claim 3, wherein the pose data for the vehicle indicates a three-dimensional pose of the vehicle with respect to a geographical location in the environment and wherein the operations further comprise determining, using the processing circuit, a geographical location of the detected target object based on the three-dimensional pose of the vehicle.

5. The system of claim 1, wherein projecting the LiDAR data points onto the image data includes fusing the LiDAR data points with image data that is obtained for the environment around the vehicle.

6. The system of claim 1, wherein automatically annotating the detected first target object present: in the map data includes indicating a location of the detected first target object in the map data, and
   the location of the detected first target object in the map data is based on a geographical location associated with the extracted subset of the LiDAR data points.

7. The system of claim 1, further comprising determining, using the processing circuit, a three-dimensional pose of the detected first target object, wherein annotating the detected first target object present in the map data includes representing the detected target object in the map data having the three-dimensional pose.

8. The system of claim 1, the operations further comprising:
determining, using the processing circuit, a three-dimensional pose of the detected first target object, wherein the registration criteria includes a criterion that is satisfied when the extracted subset of the LiDAR data points that corresponds to the detected first target object is associated with a distance that is less than a distance threshold.

9. The system of claim 1, wherein the detected first target object is a traffic light and wherein detecting the first target object in the image data includes using machine learning to detect the first target object in the image data.

10. The system of claim 1, wherein the annotating comprises adding a bounding box to the map data such that the bounding box is superimposed on the image data at a location corresponding to the detected first target object in the map data to provide a visual indication of the detected first target object.

11. A method, comprising:
obtaining map data used for navigating a vehicle, wherein the map data identifies a plurality of objects in an environment of the vehicle;
obtaining image data of an image of the environment of the vehicle, wherein the image comprises one or more objects;
obtaining, using a LiDAR, LiDAR data points corresponding to the one or more objects;
projecting, using a processing circuit, the LiDAR data points onto the image data to generate fused data, the fused data comprising a LiDAR data portion and an image data portion;
detecting, using the processing circuit, a first target object and a second target object in the fused data;
extracting, using the processing circuit, a first subset of the LiDAR data points that corresponds to the detected first target object;
extracting, using the processing circuit, a second subset of the LiDAR data points that corresponds to the detected second target object;
automatically annotating, using the processing circuit, the map data, wherein the automatically annotating comprises:
in accordance with a determination that the extracted first subset of the LiDAR data points that corresponds to the detected first target object satisfies registration criteria associated with the detected first target object, automatically annotating the map data corresponding to the detected first target object, and
in accordance with a determination that the extracted second subset of the LiDAR data points that corresponds to the detected second target object does not satisfy the registration criteria associated with detected the second target object, not annotating the map data corresponding to the detected second target object; and
navigating, using a control circuit, the vehicle in the environment according to the annotated map data.

12. The method of claim 11, wherein obtaining the LiDAR data points includes obtaining the LiDAR data points while navigating, using the control circuit, the vehicle in the environment.

13. The method of claim 12, wherein obtaining the LiDAR data points further includes:
obtaining pose data for the vehicle while navigating the vehicle in the environment; and
associating, using the processing circuit, the LiDAR data points with the pose data for the vehicle.

14. The method of claim 13, wherein the pose data for the vehicle indicates a three-dimensional pose of the vehicle with respect to a geographical location in the environment.

15. The method of claim 14, further comprising:
determining, using the processing circuit, a geographical location of the detected first target object based on the three-dimensional pose of the vehicle, wherein projecting the LiDAR data points onto the image data includes fusing the LiDAR data points with image data that is obtained for the environment around the vehicle.

16. The method of claim 11, wherein automatically annotating the detected first target object present in the map data includes indicating a location of the detected first target object in the map data, and
the location of the detected first target object in the map data is based on a geographical location associated with the extracted subset of the LiDAR data points.

17. The method of claim 11, further comprising:
determining, using the processing circuit, a three-dimensional pose of the detected first target object, wherein registering the detected first target object in the map data includes representing the detected first target object in the map data having the three-dimensional pose.

18. The method of claim 11, wherein the registration criteria includes a criterion that is satisfied when the extracted subset of the LiDAR data points that corresponds to the detected first target object is associated with a distance that is less than a distance threshold.

19. A non-transitory computer-readable storage media storing instructions which, when executed by one or more computer processors, cause performance of operations comprising:
obtaining map data used for navigating a vehicle, wherein the map data identifies a plurality of objects in an environment of the vehicle;
obtaining image data of the image of the environment of the vehicle, wherein the image comprises one or more objects;
obtaining, using a LiDAR, LiDAR data points corresponding to the one or more objects;
projecting, using a processing circuit, the LiDAR data points onto the image data to generate fused data, the fused data comprising a LiDAR data portion and an image data portion;
detecting, using the processing circuit, a first target object and a second target object in the fused data;
extracting, using the processing circuit, a first subset of the LiDAR data points that corresponds to the detected first target object;
extracting, using the processing circuit, a second subset of the LiDAR data points that corresponds to the detected second target object;
automatically annotating, using the processing circuit, the map data, wherein the automatically annotating comprises:

in accordance with a determination that the extracted first subset of the LiDAR data points that corresponds to the detected first target object satisfies registration criteria associated with the detected first target object, automatically annotating the map data corresponding to the detected first target object, and in accordance with a determination that the extracted second subset of the LiDAR data points that corresponds to the detected second target object does not satisfy the registration criteria associated with the detected second target object, not annotating the map data corresponding to the detected second target object; and navigating, using a control circuit, the vehicle in the environment according to the annotated map data.

\* \* \* \* \*